United States Patent [19]
Van Gestel et al.

[11] Patent Number: 6,118,922
[45] Date of Patent: *Sep. 12, 2000

[54] RECORDING AND REPRODUCTION OF A TRICK MODE VIDEO SIGNAL

[75] Inventors: Wilhelmus J. Van Gestel; Ronald W. J. J. Saeijs, both of Eindhoven, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/826,918

[22] Filed: Apr. 9, 1997

Related U.S. Application Data

[63] Continuation-in-part of application No. 08/402,263, Mar. 10, 1995, abandoned.

[51] Int. Cl.$^7$ ................................................. H04N 5/783
[52] U.S. Cl. ............................................. 386/68; 386/112
[58] Field of Search .................. 386/46, 68, 80, 386/81, 111, 112, 95, 116, 124, 35, 47, 90; 360/48; H04N 5/76, 5/783

[56] References Cited

U.S. PATENT DOCUMENTS

| | | | |
|---|---|---|---|
| 5,109,271 | 4/1992 | Borgers et al. | 358/13 |
| 5,142,421 | 8/1992 | Kahlman et al. | 360/40 |
| 5,245,483 | 9/1993 | Van Gestel | 360/40 |
| 5,400,187 | 3/1995 | Van Gestel | 360/48 |
| 5,424,878 | 6/1995 | Rijckaert | 360/19.1 |
| 5,550,640 | 8/1996 | Tsuboi et al. | 386/35 |
| 5,579,183 | 11/1996 | Van Gestel et al. | 360/48 |
| 5,646,692 | 7/1997 | Brüls | 348/438 |
| 5,729,648 | 3/1998 | Boyce et al. | 386/68 |

*Primary Examiner*—Huy Nguyen
*Attorney, Agent, or Firm*—Edward W. Goodman

[57] ABSTRACT

A recording arrangement is provided for recording trick mode information in portions of tracks, so as to enable a trick mode during reproduction in a reproducing arrangement. The recording arrangement includes an input terminal (11) for receiving the digital video signal, a trick play signal generating unit (80) for deriving a trick play signal from the digital video signal, and an error correction encoding unit (26,28,81). The error correction encoding unit is adapted to carry out an error correction encoding step on the digital video signal and the trick play signal, such that an additional error correction encoding step is carried out on the trick play data.

14 Claims, 14 Drawing Sheets

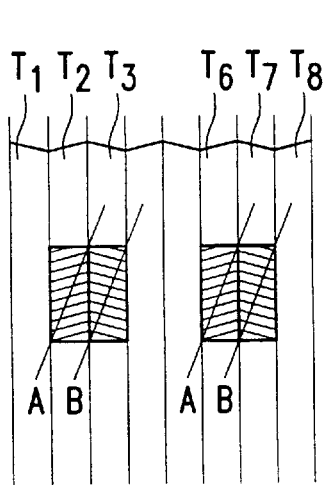 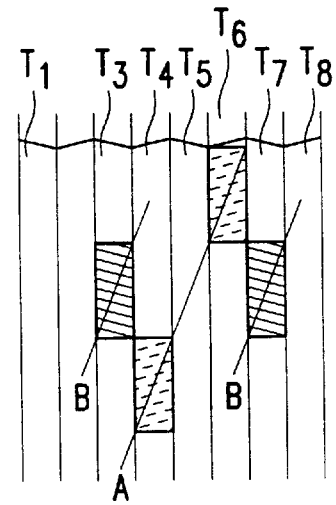 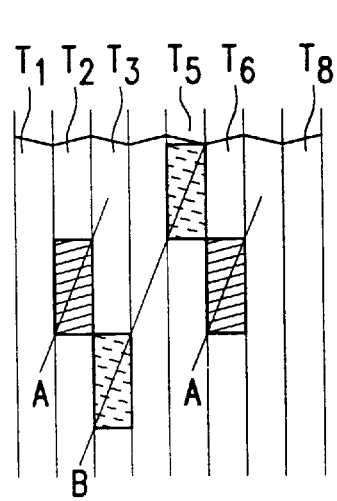
FIG. 2A  FIG. 2B  FIG. 2C
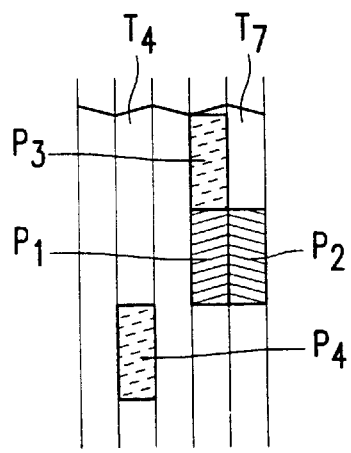 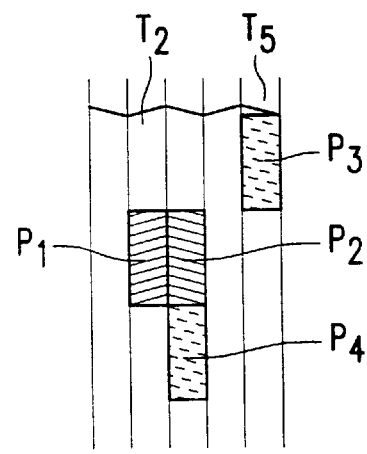
FIG. 2D  FIG. 2E

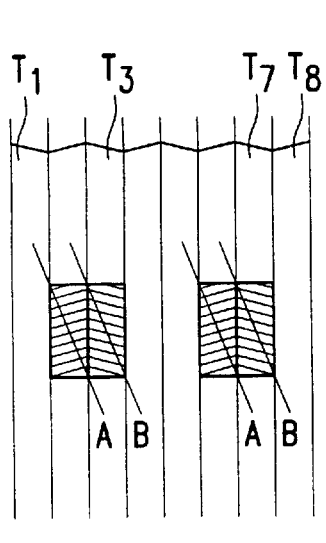
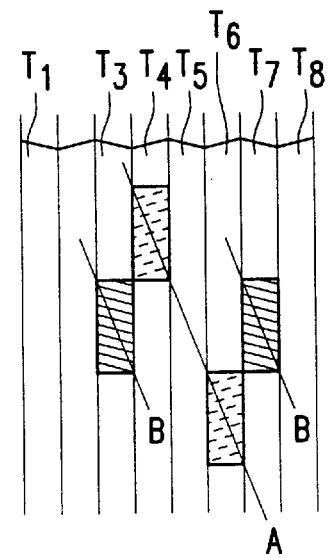
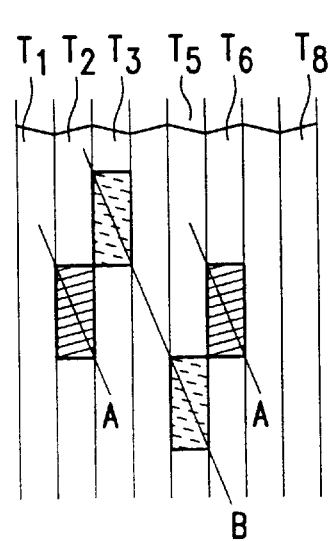
FIG. 3A  FIG. 3B  FIG. 3C
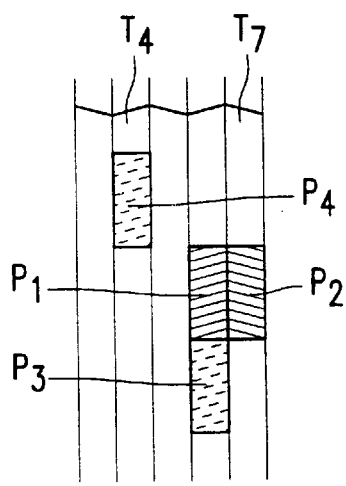
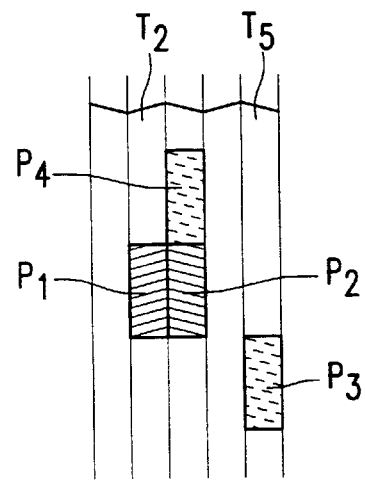
FIG. 3D  FIG. 3E

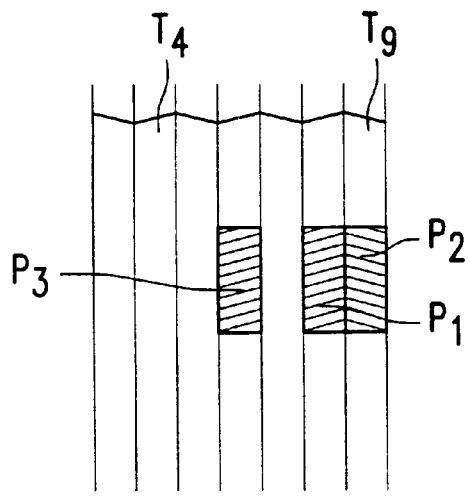
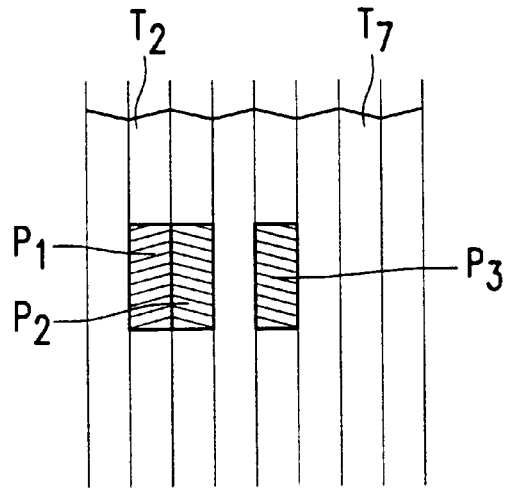
FIG. 6A  FIG. 6B
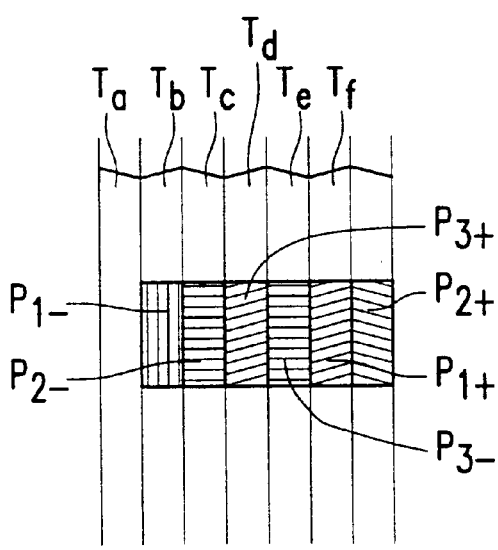
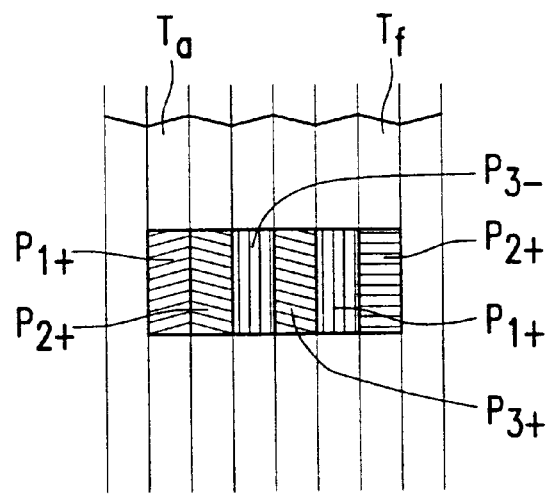
FIG. 7A  FIG. 7B

RECORDING AND REPRODUCTION OF A TRICK MODE VIDEO SIGNAL This is a continuation-in-part of application Ser. No. 08/402, 263, filed Mar. 10, 1995, abandoned.

BACKGROUND OF THE INVENTION

1. Field of the Invention

The invention relates to a recording arrangement for recording a digital video signal in tracks on a record carrier, to a method for recording the digital video signal on a record carrier, to a record carrier obtained with the recording arrangement and to a reproducing arrangement for reproducing a digital video signal from tracks on the record carrier.

2. Description of the Related Art

A recording arrangement as given in the opening paragraph is known from European Patent Application EP-A 492,704, corresponding to U.S. Pat. No. 5,245,483, Reference (1) in the List of References that can be found at the end of this application.

The known arrangement is a recording arrangement of the helical scan type and records an information signal, comprising a digital audio signal and a digital video signal, in audio signal recording sectors and video signal recording sectors, respectively, in subsequent tracks. Reference is made in this respect to the earlier filed European Patent Applications No. 93.202.950, corresponding to U.S. Pat. No. 5,424,878, Reference (2) in the List of References, and No. 93.201.263, corresponding to U.S. Pat. No. 5,400,187, Reference (3) in the List of References.

The prior art documents relate to proposals for the realization of a new digital video cassette (DVC) recorder standard, which enables the recording and reproduction of digital video and digital audio on/from a longitudinal magnetic record carrier. This new digital video recorder standard will lead to new digital videorecorders/reproducers of the so-called DVC type.

SUMMARY OF THE INVENTION

The invention aims at providing a recording arrangement which is capable of recording other type of information signals. More specifically, the invention aims at providing such information to be recorded that one or more trick modes during reproduction of the signals from the record carrier are possible. The recording arrangement in accordance with the invention comprises a recording arrangement for recording a digital video signal in tracks on a record carrier, the arrangement comprising:

input means (11) for receiving the digital video signal, trick play signal generating means (80) for deriving a trick play signal from the digital video signal, error correction encoding means (26,28,81) for carrying out an error correction encoding step on the digital video signal and the trick play signal, the error correction encoding means comprising a first error correction encoding stage (81) for carrying out a first error correction encoding step on a block of trick play data comprised in the trick play signal, the first error correction encoding stage being adapted to add first parity words to the block of trick play data so as to obtain an error correction encoded block of trick play data, the error correction encoding means further comprising a second error correction encoding stage (26,28) for carrying out a second error correction encoding step on a block of data comprised in the digital video signal and the error correction encoded block of trick play data, the second error correction encoding stage being adapted to combine the block of data of the digital video signal and the error correction encoded block of trick play data so as to obtain a composite block of data, and being adapted to add second parity words to the composite block of data so as to obtain an error correction encoded composite block of data, and writing means (36) for writing error correction encoded composite blocks of data in the tracks.

The invention is based on the recognition that errors may occur during reproduction of the trick play data if no further precautions are taken. In order to decrease the probability of occurrence of errors, an additional error correction encoding step is carried out on the trick play data so as to make the trick play data less vulnerable for errors upon reproduction.

It should be noted that various prior art documents, relating to various ways of realizing trick modes during read out from a record carrier, are given in the List of References, see the References (7), (8) and (9) in the List of References.

BRIEF DESCRIPTION OF THE DRAWINGS

These and other aspects of the invention will be apparent from and elucidated with reference to the embodiments described hereafter in the figures of the drawings, in which:

FIGS. 2A to 2E show various track configurations for realizing a $2.v_n$ trick mode;

FIGS. 3A to 3E show various track configurations for realizing a $-2.v_n$ trick mode;

FIGS. 6A and 6B show track configurations for realizing a $-3.v_n$ trick mode;

FIGS. 7A and 7B show track configurations for realizing a $3.v_n$ trick mode and a $-3.v_n$ trick mode;

DESCRIPTION OF THE PREFERRED EMBODIMENTS

Figure 1A:
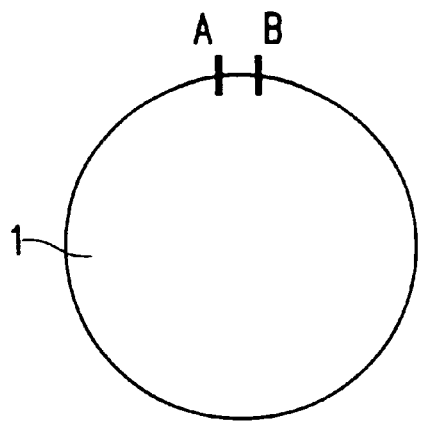
FIG. 1A, FIG. 1B and FIG. 1C each show a scanner configuration of the recording arrangement or the reproducing arrangement.
Figure 1B:
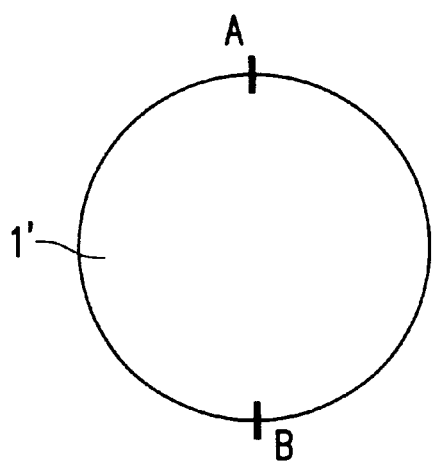
Figure 1C:
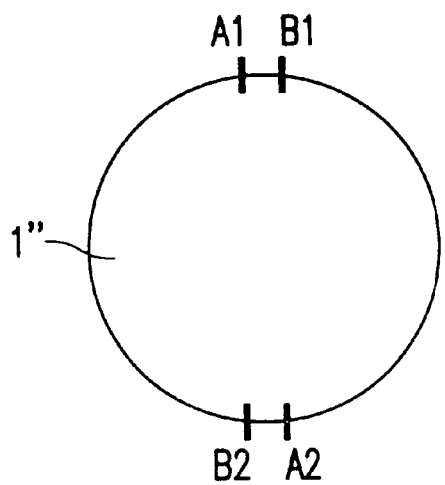

FIGS. 1A to 1C show three scanner configurations for a recording arrangement and for a reproducing arrangement for realizing a 'normal play' reproduction mode and a 'trick play' reproduction mode. FIG. 1A shows a scanner 1, provided with one head pair with heads, denoted A and B, located side by side and being rigidly connected, and having gaps with different azimuth angles. FIG. 1B shows a scanner 1', provided with a pair of separate heads, denoted A and B, with gaps having different azimuth angles and located on the circumference of the head drum at an angle of 180°. FIG. 1C shows a scanner 1", provided with two head pairs, one head pair denoted A1, B1 and the second head pair denoted A2, B2. The heads in each head pair having gaps of different azimuth angles. Both head pairs are located on the circumference of the head drum at an angle of 180°.

It should be noted here that recording arrangements provided with the scanner configurations as per FIGS. 1A or 1B, have the same rotational velocity of the head drum. Recording arrangements provided with the scanner configuration as per FIG. 1C has a rotational velocity for the head drum which is half the rotational velocity given above. In the same way, reproducing arrangements having the scanner configurations as per one of the FIGS. 1A or 1B, have the same rotational velocity as the recording arrangements provided with the same scanner configuration. Reproducing arrangements having the scanner configuration as per FIG. 1C, have half that rotational velocity.

It should be noted that even other scanner configurations are possible, such as, e.g., four separate heads located at 90° on the circumference of the head drum, two heads located at 180° now having the same azimuth angle, or a scanner configuration with more than two head pairs.

FIG. 2A shows how the heads A and B of the scanner configuration of FIG. 1A scan the tracks in a trick mode, where the record carrier has a velocity of twice the nominal velocity $v_n$ in, e.g., the forward direction, where $v_n$ is the velocity of the record carrier during reproduction in the normal play mode. FIG. 2A shows a number of tracks $T_1$ to $T_8$, where the odd numbered tracks have video information recorded in them with one of the heads A and B, that is, with a head having a head gap with a certain azimuth angle, and the even numbered tracks have video information recorded in them with the head having the gap with the other azimuth angle. It is assumed here that the head A reads the video information recorded in the even numbered tracks and the head B reads the video information recorded in the odd numbered tracks.

In the 2 times $v_n$ trick mode, the head pair scans the tracks as shown by the path lines denoted A and B. The heads A and B read the information recorded in the hatched portions in the track pairs $T_2, T_3$ and $T_6, T_7$, where the head A reads the information stored in the hatched portions in the tracks $T_2$ and $T_4$, and the head B reads the information stored in the hatched portions in the tracks $T_3$ and $T_7$.

It should be noted here that, if the recording arrangement would have had the scanner configuration as per FIG. 1C, the same track paths would have been present, where the paths crossing the tracks $T_2, T_3$ would have been realized by the head pair A1,B1, and the paths crossing the tracks $T_6, T_7$ would have been realized by the head pair A2,B2.

It should be noted here that FIG. 2A gives the impression that the tracks lie exactly transverse to the length direction of the record carrier. This is not so. The tracks lie slant across the record carrier. Therefore, although the portions lie on the same height in the tracks, there will be a slight shift in the length direction of the track between the portions in the tracks $T_1, T_2$ and the tracks $T_7, T_8$.

FIG. 2B shows how the heads A and B of the scanner configuration of FIG. 1B scan the tracks in a trick mode, where the record carrier has the velocity of twice the nominal velocity $v_n$. FIG. 2B shows the same number of tracks $T_1$ to $T_8$ as FIG. 2A. It is again assumed that the head A reads the video information in the even numbered tracks and the head B reads the video information recorded in the odd numbered tracks.

In the 2 times $v_n$ trick mode, the heads A and B scan the tracks as shown by the path lines denoted A and B. The head B reads the information recorded in the hatched portions in the tracks $T_3$ and $T_7$. The head A scans the record carrier along the line denoted A, which lies exactly between the lines denoted B in FIG. 2B. The head A cannot read information from the track $T_5$, as the head A has the wrong azimuth for reading information from the track $T_5$. The head A is capable of reading information recorded in the tracks $T_4$ and $T_6$, and can read the information stored in the hatched portions in the tracks $T_4$ and $T_6$, which hatched portions do not lie at the same height (or at the same location) as the hatched portions in the tracks $T_3$ and $T_7$.

The following can be said if it is required to read the same information from the record carrier when scanning the record carrier in one revolution of the head drum in the situations of FIGS. 2A and 2B. The hatched portion in the track $T_3$ in FIG. 2A can have the same contents as the hatched portion in the track $T_3$ in FIG. 2B, and the hatched portion in the track $T_7$ in FIG. 2A then has the same contents as the hatched portion in the track $T_7$ of FIG. 2B. As regards the contents of the hatched portion in the track $T_6$ in FIG. 2A and the hatched portions in the tracks $T_4$ and $T_6$ in FIG. 2B, the following can be said. The hatched portion in the track $T_6$ in FIG. 2A can have the same contents as either the hatched portion in the track $T_4$ in FIG. 2B (in which case the hatched portion in the track $T_6$ in FIG. 2B is not needed, or can be used to store other information in it) or the hatched portion in the track $T_6$ in FIG. 2B (in which case the hatched portion in the track $T_4$ in FIG. 2B is not needed, or can be used to store other information in it). As an alternative, the hatched portions in the tracks $T_4$ and $T_6$ in FIG. 2B can, as an example, be half as long and comprise, together, the same information as stored in the hatched portion in the track $T_6$ in FIG. 2A.

FIG. 2C shows, in fact, the same situation as FIG. 2B, except for the fact that the hatched portions in the tracks $T_2$ and $T_6$, read by the head A, are taken as a kind of reference. The head B now scans the record carrier along the line denoted B, which lies exactly between the lines denoted A in FIG. 2C. The head B cannot read information from the track $T_4$, as the head B has the wrong azimuth for reading information from the track $T_4$. The head B is capable of reading information recorded in the tracks $T_3$ and $T_5$, and can read the information stored in the hatched portions in the tracks $T_3$ and $T_5$, which hatched portions do not lie at the same height (or at the same location) as the hatched portions in the tracks $T_2$ and $T_6$.

The following can be said if it is required to read the same information from the record carrier when scanning the record carrier in one revolution of the head drum in the situations of FIGS. 2A and 2C. The hatched portion in the track $T_2$ in FIG. 2A can have the same contents as the hatched portion in the track $T_2$ in FIG. 2C, and the hatched portion in the track $T_6$ in FIG. 2A then has the same contents as the track portion in the track $T_6$ in FIG. 2C. Now the following can be said about the contents of the track portions in the track $T_3$ in FIG. 2A and the tracks $T_3$ and $T_5$ in FIG. 2C. The hatched portion in the track $T_3$ in FIG. 2A can have the same contents as either the hatched portion in the track $T_3$ (in which case the hatched portion in the track $T_5$ is not needed, or can be used to store other information in it) or the hatched portion in the track $T_5$ in FIG. 2C (in which case the hatched portion in the track $T_3$ is not needed, or can be used to store other information in it). As an alternative, the hatched portions in the tracks $T_3$ and $T_5$ in FIG. 2C can, as an example, be half as long and comprise, together, the same information as stored in the hatched portion in the track $T_3$ in FIG. 2A.

The situations of the FIGS. 2A and 2B can be combined so as to enable a two times $v_n$ trick mode for reproducing arrangements having either the scanner configuration of FIG. 1A, or the scanner configuration of FIG. 1B, or the scanner configuration of FIG. 1C. This results in the track format as shown in FIG. 2D. In a group of 4 tracks, denoted $T_4$ to $T_7$, the hatched portions $P_1$ and $P_2$ in the tracks $T_6$ and $T_7$ are the same as the hatched portions shown in the tracks $T_6$ and $T_7$ in FIG. 2A, and the hatched portions $P_3$ and $P_4$ in the tracks $T_6$ and $T_4$, respectively, correspond to the hatched portions shown in the tracks $T_6$ and $T_4$, respectively, in FIG. 2B.

What has been said earlier in relation to the hatched portions in the tracks $T_4$ and $T_6$ in FIG. 2B, is thus equally valid for the hatched portions $P_3$ and $P_4$ in FIG. 2D. That is: the hatched portion $P_1$ in the track $T_6$ has the same contents as either the hatched portion $P_3$ in the track $T_6$ (in which case the hatched portion $P_4$ in the track $T_4$ is not needed, or can be used to store other information in it), or the hatched portion $P_4$ in the track $T_4$ (in which case the hatched portion $P_3$ in the track $T_6$ is not needed, or can be used to store other information in it). As an alternative, the hatched portions $P_3$ and $P_4$ in the tracks $T_6$ and $T_4$ in FIG. 2D can, as an example, be half as long and comprise, together, the same information as stored in the hatched portion $P_1$ in the track $T_6$. For neighboring groups of 4 tracks, an identical track format is present at the same locations in those groups as in the group shown in FIG. 2D, for the storage of trick mode information, so as to realize a trick mode reproduction at a tape transport speed of two times $v_n$.

It should further be noted that the portions that are located in one track, such as the portions $P_1$ and $P_3$ in the track $T_6$ in FIG. 2D, need not directly adjoin each other, e.g., in the situation where the portions need not be that long as shown in FIG. 2D, for the reason that the amount of 'trick play' information to be stored in the tracks requires less large portions. So, there may be gaps present between those portions, where those gaps could have been used for storing 'normal play' information, that is: the information for realizing a 'normal play' reproduction. Further, the portion $P_4$ in the track $T_4$ may be located at a more lower location in that track.

As an alternative of combining the situations of FIGS. 2A and 2B, the situations of the FIGS. 2A and 2C can be combined so as to enable a two times $v_n$ trick mode for reproducing arrangements having either the scanner configuration of FIG. 1A, or the scanner configuration of FIG. 1B, or the scanner configuration of FIG. 1C. This results in the track format as shown in FIG. 2E. In a group of 4 tracks, denoted $T_2$ to $T_5$, the hatched portions $P_1$ and $P_2$ in the tracks $T_2$ and $T_3$ are the same as the hatched portions shown in the tracks $T_2$ and $T_3$ in FIG. 2A, and the hatched portions $P_3$ and $P_4$ in the tracks $T_5$ and $T_3$ correspond to the hatched portions shown in the tracks $T_3$ and $T_5$ in FIG. 2C. What has been said earlier in relation to the hatched portions in the tracks $T_3$ and $T_5$ in FIG. 2C, is thus equally valid for the hatched portions $P_3$ and $P_4$ in FIG. 2E. That is: the hatched portion $P_2$ in the track $T_3$ has the same contents as either the hatched portion $P_3$ in the track $T_5$ (in which case the hatched portion $P_4$ in the track $T_3$ is not needed, or can be used to store other information in it), or the hatched portion $P_4$ in the track $T_3$ (in which case the hatched portion $P_3$ in the track $T_5$ is not needed, or can be used to store other information in it). As an alternative, the hatched portions $P_3$ and $P_4$ in the tracks $T_5$ and $T_3$, respectively, in FIG. 2D can, as an example, be half as long and comprise, together, the same information as stored in the hatched portion $P_2$ in the track $T_3$. For neighboring groups of 4 tracks, an identical track format is present at the same locations in those groups as in the group shown in FIG. 2E, for the storage of trick mode information, so as to realize a trick m ode reproduction at a tape transport speed of two times $v_n$. Further, what has been said above with reference to FIG. 2D for the position of the portions in the tracks, namely, that they need not necessarily be adjoining to each other, but can have a gap in between, is, in general, applicable, and thus also equally applicable here.

FIG. 3A shows how the heads A and B of the scanner configuration of FIG. 1A scan the tracks in a trick mode, where the record carrier has a velocity of twice the nominal velocity $v_n$ in the reverse direction, where $v_n$ is the velocity of the record carrier during reproduction in the normal play mode. FIG. 3A shows, in the same way as FIG. 2A, the tracks $T_1$ to $T_8$.

In the 2 times $v_n$ trick mode in the reverse direction (otherwise called the −2 times $v_n$ trick mode), the head pair scans the tracks as shown by the path lines denoted A and B. The heads A and B read the information recorded in the hatch ed portions in the track pairs $T_2$, $T_3$ and $T_6$, $T_7$, where the head A reads the information stored in the hatched portions in the tracks $T_2$ and $T_4$ and the head B reads the information stored in the hatched portions in the tracks $T_3$ and $T_7$.

It should again be noted here that, if the recording arrangement would have had the scanner configuration as per FIG. 1C, the same track paths would have been present, where the paths crossing the tracks $T_2$,$T_3$ would have been realized by the head pair A1,B1, and the paths crossing the tracks $T_6$,$T_7$ would have been realized by the head pair A2,B2.

FIG. 3B shows how the heads A and B of the scanner configuration of FIG. 1B scan the tracks in a trick mode, where the record carrier has the velocity of minus twice the nominal velocity $v_n$. FIG. 3B shows the same number of tracks $T_1$ to $T_8$ as FIG. 3A.

In the −2 times $v_n$ trick mode, the heads A and B scan the tracks as shown by the path lines denoted A and B. The head B reads the information recorded in the hatched portions in the tracks $T_3$ and $T_7$. The head A scans the record carrier along the line denoted A, which lies exactly between the lines denoted B in FIG. 3B. The head A cannot read information from the track $T_5$, as the head A has the wrong azimuth for reading information from the track $T_5$. The head A is capable of reading information recorded in the tracks $T_4$ and $T_6$, and can read the information stored in the hatched portions in the tracks $T_4$ and $T_6$, which hatched portions do not lie at the same height (or at the same location) as the hatched portions in the tracks $T_3$ and $T_7$.

The following can be said if it is required to read the same information from the record carrier when scanning the record carrier in one revolution of the head drum in the situations of FIGS. 3A and 3B. The hatched portion in the track $T_3$ in FIG. 3A can have the same contents as the hatched portion in the track $T_3$ in FIG. 3B, and the hatched portion in the track $T_7$ in FIG. 3A then has the same contents as the hatched portion in the track $T_7$ in FIG. 3B. Now, the following can be said as regards the hatched portions in the track $T_6$ of FIG. 3A and the tracks $T_4$ and $T_6$ in FIG. 3B. The hatched portion in the track $T_6$ in FIG. 3A can have the same contents as either the hatched portion in the track $T_4$ in FIG. 3B (in which case the hatched portion in the track $T_6$ in FIG. 3B is not needed, or can be used to store other information in it), or the hatched portion in the track $T_6$ in FIG. 3B (in which case the hatched portion in the track $T_4$ is not needed, or can be used to store other information in it). As an alternative, the hatched portions in the tracks $T_4$ and $T_6$ in FIG. 3B can, as an example, be half as long and comprise, together, the same information as stored in the hatched portion in the track $T_6$ in FIG. 3A.

FIG. 3C shows, in fact, the same situation as FIG. 3B, except for the fact that the hatched portions in the tracks $T_2$ and $T_6$ read by the head A are taken as a kind of reference. The head B now scans the record carrier along the line denoted B, which lies exactly between the lines denoted A in FIG. 3C. The head B cannot read information from the track $T_4$, as the head B has the wrong azimuth for reading information from the track $T_4$. The head B is capable of reading information recorded in the tracks $T_3$ and $T_5$, and can read the information stored in the hatched portions in the tracks $T_3$ and $T_5$, which hatched portions do not lie at the same height (or at the same location) as the hatched portions in the tracks $T_2$ and $T_6$.

The following can be said if it is required to read the same information from the record carrier when scanning the record carrier in one revolution of the head drum in the situations of FIGS. 3A and 3C. The hatched portion in the track $T_2$ in FIG. 3A can have the same contents as the hatched portion in the track $T_2$ in FIG. 3C, and the hatched portion in the track $T_6$ in FIG. 3A then has the same contents as the hatched portion in the track $T_6$ in FIG. 3C. The following can be said as regards the hatched portions in the track $T_3$ in FIG. 3A and in the tracks $T_3$ and $T_5$ in FIG. 3C. The hatched portion in the track $T_3$ in FIG. 3A can have the same contents as either the hatched portion in the track $T_3$ in FIG. 3C (in which case the hatched portion in the track $T_5$ in FIG. 3C is not needed, or can be used to store other information in it) or the hatched portion in the track $T_5$ in FIG. 3C (in which case the hatched portion in the track $T_3$ is not needed, or can be used to store other information in it). As an alternative, the hatched portions in the tracks $T_3$ and $T_5$ in FIG. 3C can, as an example, be half as long and comprise, together, the same information as stored in the hatched portion in the track $T_3$ in FIG. 3A.

The situations of the FIGS. 3A and 3B can be combined so as to enable a minus two times $v_n$ trick mode for reproducing arrangements having either the scanner configuration of FIG. 1A, or the scanner configuration of FIG. 1B, or the scanner configuration of FIG. 1C. This results in the track format as shown in FIG. 3D. In a group of 4 tracks, denoted $T_4$ to $T_7$, the hatched portions $P_1$ and $P_2$ in the tracks $T_6$ and $T_7$ are the same as the hatched portions shown in the tracks $T_6$ and $T_7$ in FIG. 3A, and the hatched portions $P_3$ and $P_4$ in the tracks $T_6$ and $T_4$, respectively, correspond to the hatched portions shown in the tracks $T_6$ and $T_4$ in FIG. 3B. What has been said earlier in relation to the hatched portions in the tracks $T_4$ and $T_6$ in FIG. 3B, is thus equally valid for the hatched portions $P_3$ and $P_4$ in FIG. 3D.

For neighboring groups of 4 tracks, an identical track format is present at the same locations in those groups as in the group shown in FIG. 3D, for the storage of trick mode information, so as to realize a trick mode reproduction at a tape transport speed of minus two times $v_n$.

One general remark should be made here as regards a $+n.v_n$ trick mode and a $-n.v_n$ trick mode, more specifically as regards the patterns shown in FIG. 3D just described for the $-2.v_n$ trick mode, and FIG. 2E for the $+2.v_n$ trick mode. When comparing the FIGS. 2E and 3D, it looks as if both patterns are mirror symmetrical. For explanatory reasons and for simplicity reasons they are. In reality, however, they are not, as the tracks run slant over the record carrier and the paths that a head runs across the record carrier in the $+n.v_n$ trick mode and the $-n.v_n$ trick mode are not mirror symmetrical around a line exactly transverse to the record carrier. As a result, the position of the portions $P_3$ in the track $T_5$ in FIG. 2E and $P_4$ in the track $T_4$ in FIG. 3D will not be the same. In the same way, the position of the portions $P_4$ in the track $T_3$ in FIG. 2E and $P_3$ in the track $T_6$ in FIG. 3D will not be the same, see also the description to FIGS. 4A to 4C. For the same reasons as given above, the two portions $P_{1-}$ and $P_{2-}$ will also be slightly shifted relative to each other in the length direction of the tracks.

As an alternative to combining the FIGS. 3A and 3B, the situations of the FIGS. 3A and 3C can be combined so as to enable a minus two times $v_n$ trick mode for reproducing arrangements having either the scanner configuration of FIG. 1A, or the scanner configuration of FIG. 1B, or the scanner configuration of FIG. 1C. This results in the track format as shown in FIG. 3E. In a group of 4 tracks, denoted $T_2$ to $T_5$, the hatched portions $P_1$ and $P_2$ in the tracks $T_2$ and $T_3$ are the same as the hatched portions shown in the tracks $T_2$ and $T_3$ in FIG. 3A, and the hatched portions $P_3$ and $P_4$ in the tracks $T_5$ and $T_3$ correspond to the hatched portions shown in the tracks $T_5$ and $T_3$ in FIG. 3C. What has been said earlier in relation to the hatched portions in the tracks $T_3$ and $T_5$ in FIG. 3C, is thus equally valid for the hatched portions $P_3$ and $P_4$ in FIG. 3E. For neighboring groups of 4 tracks, an identical track format is present at the same locations in those groups as in the group shown in FIG. 3E, for the storage of trick mode information, so as to realize a trick mode reproduction at a tape transport speed of minus two times $v_n$.

Figure 4A:
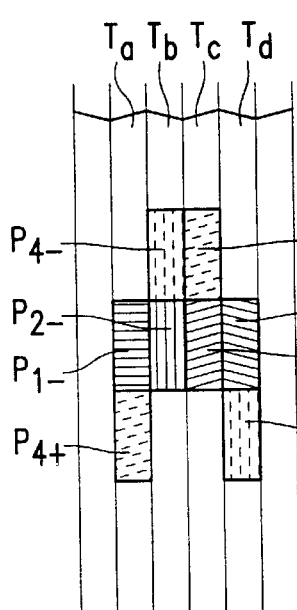
FIGS. 4A to 4C show various track configurations for realizing a $2.v_n$ trick mode and a $-2.v_n$ trick mode.

FIG. 4A shows a combination of the formats of FIGS. 2D and 3E, so as to realize both trick modes, that is: the 2 times $v_n$ trick mode and the $-2$ times $v_n$ trick mode. FIG. 4A shows, again, a group of 4 tracks $T_a$ to $T_d$. The portions denoted $P_{1+}$ to $P_{4+}$ correspond to the portions $P_1$ to $P_4$, respectively, shown in FIG. 2D, and the portions denoted $P_{1-}$ to $P_{4-}$ correspond to the portions $P_1$ to $P_4$, respectively, shown in FIG. 3E. For neighboring groups of 4 tracks, an identical track format is present at the same locations in those groups as in the group shown in FIG. 4A, for the storage of trick mode information, so as to realize a trick mode reproduction at a tape transport speed of plus and minus two times $v_n$.

Previously, it has been said that the position of the portions in the tracks differ for the $+n.v_n$ trick mode and the $-n.v_n$ trick mode. As a result, the portions $P_{1-}, P_{2-}$ and $P_{1+}, P_{2+}$ need not lie on the same height in a track. Further, assuming the portions $P_{1-}, P_{2-}$ and $P_{1+}, P_{2+}$ lie on substantially the same height in the tracks, the distance between the portions $P_{2-}$ and $P_{4-}$ in the track $T_b$ will be different from the distance between the portions $P_{1+}$ and $P_{3+}$ in the track $T_c$, and the distance between the portions $P_{1-}$ and $P_{4+}$ in the track $T_a$ will be different from the distance between the portions $P_{2+}$ and $P_{3-}$ in the track $T_d$. The same, or an equivalent, reasoning will be valid for all the other combinations of a $+n.v_n$ trick mode pattern and a $-n.v_n$ trick mode pattern.

Figure 4B:
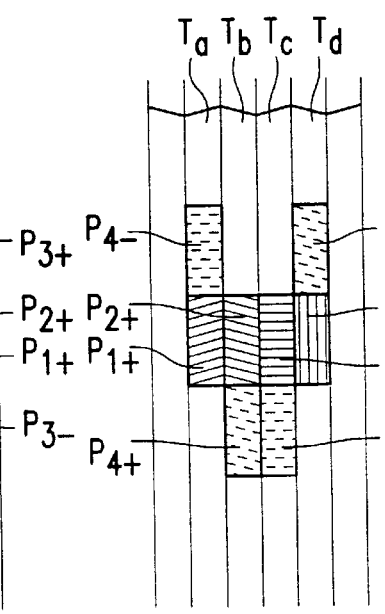

FIG. 4B shows a combination of the formats of FIGS. 2E and 3D, so as to realize both trick modes, that is: the 2 times $v_n$ trick mode and the $-2$ times $v_n$ trick mode. FIG. 4B shows, again, a group of 4 tracks $T_a$ to $T_d$. The portions denoted $P_{1+}$ to $P_{4+}$ correspond to the portions $P_1$ to $P_4$, respectively, shown in FIG. 2E, and the portions denoted $P_{1-}$ to $P_{4-}$ correspond to the portions $P_1$ to $P_4$, respectively, shown in FIG. 3D. For neighboring groups of 4 tracks, an identical track format is present at the same locations in those groups as in the group shown in FIG. 4B, for the storage of trick mode information, so as to realize a trick mode reproduction at a tape transport speed of plus and minus two times $v_n$.

Figure 4C:
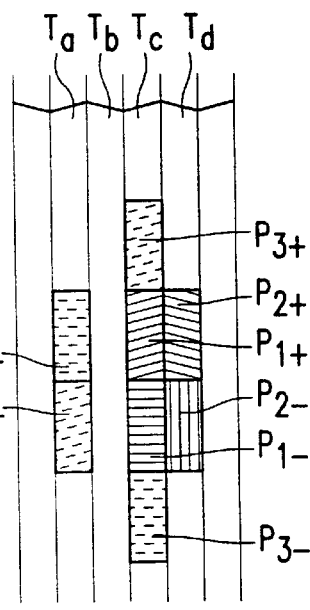

FIG. 4C shows a combination of the formats of FIGS. 2D and 3D, so as to realize both trick modes, that is: the 2 times $v_n$ trick mode and the $-2$ times $v_n$ trick mode. FIG. 4C shows, again, a group of 4 tracks $T_a$ to $T_d$. The portions denoted $P_{1+}$ to $P_{4+}$ correspond to the portions $P_1$ to $P_4$, respectively, shown in FIG. 2D, and the portions denoted $P_{1-}$ to $P_{4-}$ correspond to the portions $P_1$ to $P_4$, respectively, shown in FIG. 3D. For neighboring groups of 4 tracks, an identical track format is present at the same locations in those groups as in the group shown in FIG. 4B, for the storage of trick mode information, so as to realize a trick mode reproduction at a tape transport speed of plus and minus two times $v_n$. The difference with the formats of FIGS. 4A and 4B is that the trick mode information in the portions $P_{1+}$ and $P_{2+}$, the portions $P_{1-}$ and $P_{2-}$ do not lie at the same height (in the same location) in a track.

It will be clear that a fourth format could have been obtained when combining the formats of FIGS. 2E and 3E.

Figure 5A:
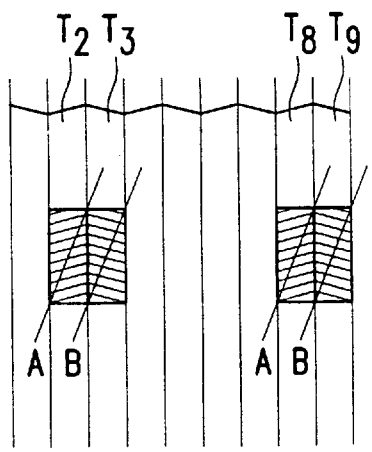
FIGS. 5A to 5E show various track configurations for realizing a $3.v_n$ trick mode.

Further, it should be noted that in each group of four tracks as shown in the FIGS. 4A to 4C, the information contents of the portions $P_{1+}$ and $P_{1-}$, and the information contents of the portions $P_{2-}$ and $P_{2+}$ can be equal to each other FIG. 5A now shows how the heads A and B of the scanner configuration of FIG. 1A scan the tracks in a trick mode, where the record carrier has a velocity of three times the nominal velocity $v_n$ in, e.g., the forward direction.

In the 3 times $v_n$ trick mode, the head pair scans the tracks as shown by the path lines denoted A and B. The heads A and B read the information recorded in the hatched portions in the track pairs $T_2$, $T_3$ and $T_8$, $T_9$, where the head A reads the information stored in the hatched portions in the tracks $T_2$ and $T_8$ and the head B reads the information stored in the hatched portions in the tracks $T_3$ and $T_9$.

It should be noted here that, if the recording arrangement would have had the scanner configuration as per FIG. 1C, the same track paths would have been present, where the paths crossing the tracks $T_2, T_3$ would have been realized by the head pair A1,B1, and the paths crossing the tracks $T_8, T_9$ would have been realized by the head pair A2,B2.

Figure 5B:
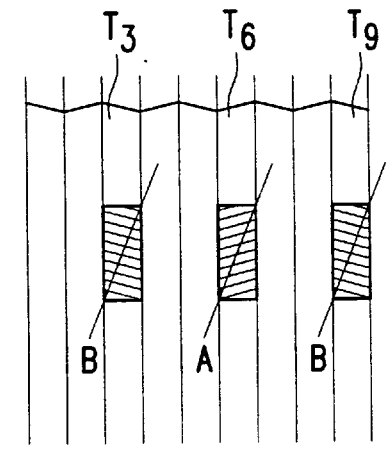

FIG. 5B shows how the heads A and B of the scanner configuration of FIG. 1B scan the tracks in a trick mode, where the record carrier has the velocity of three times the nominal velocity $v_n$. FIG. 5B shows the same number of tracks $T_1$ to $T_9$ as FIG. 5A.

In the 3 times $v_n$ trick mode, the heads A and B scan the tracks as shown by the path lines denoted A and B. The head B reads the information recorded in the hatched portions in the tracks $T_3$ and $T_9$. The head A scans the record carrier along the line denoted A, which lies exactly between the lines denoted B in FIG. 5B. The head A can read information from the hatched portion in the track $T_6$, as the head A has the correct azimuth for reading information from the track $T_6$.

The following can be said if it is required to read the same information from the record carrier when scanning the record carrier in one revolution of the head drum in the situations of FIG. 5A and 5B. The hatched portion in the track $T_3$ in FIG. 5A can have the same contents as the hatched portion in the track $T_3$ in FIG. 5B, and the hatched portion in the track $T_9$ in FIG. 5A then has the same contents as the hatched portion in the track $T_9$ of FIG. 5B. As regards the contents of the hatched portion in the track $T_8$ in FIG. 5A and the hatched portion in the track $T_6$ in FIG. 5B, it can be said they both have the same contents.

Figure 5C:
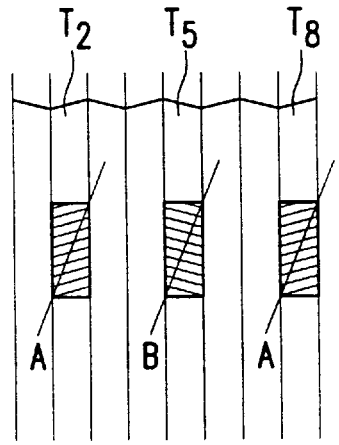

FIG. 5C shows, in fact, the same situation as FIG. 5B, except for the fact that the hatched portions in the tracks $T_2$ and $T_8$ read by the head A are taken as a kind of reference. The head B now scans the record carrier along the line denoted B, which lies exactly between the lines denoted A in FIG. 5C. The head B can read information from the track $T_5$, as the head B has the correct azimuth for reading information from the track $T_5$.

The following can be said if it is required to read the same information from the record carrier when scanning the record carrier in one revolution of the head drum in the situations of FIGS. 5A and 5C. The hatched portion in the track $T_2$ in FIG. 5A can have the same contents as the hatched portion in the track $T_2$ in FIG. 5C, and the hatched portion in the track $T_8$ in FIG. 5A then has the same contents as the track portion in the track $T_8$ in FIG. 5C. Now the following can be said about the contents of the hatched portion in the track $T_3$ in FIG. 5A and the hatched portion in the track $T_5$ in FIG. 5C. The hatched portion in the track $T_3$ in FIG. 5A has the same contents as the hatched portion in the track $T_5$ in FIG. 5C.

Figure 5D:
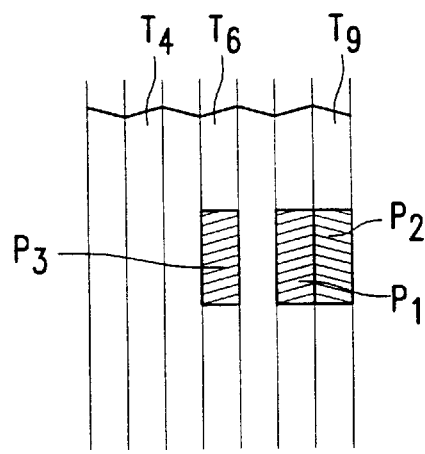

The situations of the FIGS. 5A and 5B can be combined so as to enable a three times $v_n$ trick mode for reproducing arrangements having either the scanner configuration of FIG. 1A, or the scanner configuration of FIG. 1B, or the scanner configuration of FIG. 1C. This results in the track format as shown in FIG. 5D. In a group of 6 tracks, denoted $T_4$ to $T_9$, the hatched portions $P_1$ $_{nd\ P2}$ in the tracks $T_8$ and $T_9$ are the same as the hatched portions shown in the tracks $T_8$ and $T_9$ in FIG. 5A, and the hatched portion $P_3$ in the track $T_6$ corresponds to the hatched portion shown in the track $T_6$ in FIG. 5B.

What has been said earlier in relation to the hatched portion in the track $T_6$ in FIG. 5B, is thus equally valid for the hatched portion $P_3$ in FIG. 5D. That is: the hatched portion $P_1$ in the track $T_8$ has the same contents as the hatched portion $P_3$ in the track $T_6$. For neighboring groups of 6 tracks, an identical track format is present at the same locations in those groups as in the group shown in FIG. 5D, for the storage of trick mode information, so as to realize a trick mode reproduction at a tape transport speed of three times $v_n$.

Figure 5E:
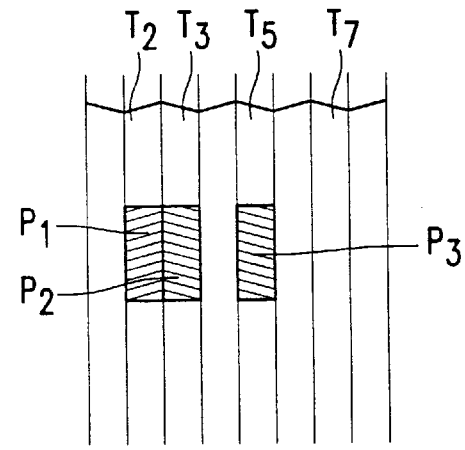

As an alternative, the situations of the FIGS. 5A and 5C can be combined so as to enable a three times $v_n$ trick mode for reproducing arrangements having either the scanner configuration of FIG. 1A, or the scanner configuration of FIG. 1B, or the scanner configuration of FIG. 1C. This results in the track format as shown in FIG. 5E. In a group of 6 tracks, denoted $T_2$ to $T_7$, the hatched portions $P_1$ and $P_2$ in the tracks $T_2$ and $T_3$ are the same as the hatched portions shown in the tracks $T_2$ and $T_3$ in FIG. 5A, and the hatched portion $P_3$ in the track $T_5$ corresponds to the hatched portion shown in the track $T_5$ in FIG. 5C. What has been said earlier in relation to the hatched portion in the track $T_5$ in FIG. 5C, is thus equally valid for the hatched portion $P_3$ in FIG. 5E. That is: the hatched portion $P_2$ in the track $T_3$ has the same contents as the hatched portion $P_3$ in the track $T_5$. For neighboring groups of 6 tracks, an identical track format is present at the same locations in those groups as in the group shown in FIG. 5E, for the storage of trick mode information, so as to realize a trick mode reproduction at a tape transport speed of three times $v_n$.

The same exercise as has been carried out with reference to FIGS. 3A–3E, for the minus 2 times $v_n$ trick mode, can be carried out for the minus 3 times $v_n$ trick mode. The results are shown in FIGS. 6A and 6B.

In order to enable a minus three times $v_n$ trick mode for reproducing arrangements having either the scanner configuration of FIG. 1A, or the scanner configuration of FIG. 1B, or the scanner configuration of FIG. 1C, a track format as shown in FIG. 6A can be used. In a group of 6 tracks, denoted $T_4$ to $T_7$, the hatched portions $P_1$ and $P_2$ in the tracks $T_8$ and $T_9$ are the same as the hatched portions shown in the tracks $T_8$ and $T_9$ in FIG. 5A, and the hatched portion $P_3$ in the track $T_6$ has the same contents as the hatched portion $P_1$ in the track $T_8$. For neighboring groups of 6 tracks, an identical track format is present at the same locations in those groups as in the group shown in FIG. 6A, for the storage of trick mode information, so as to realize a trick mode reproduction at a tape transport speed of minus three times $v_n$.

It will become clear when comparing the groups of 6 tracks shown in FIGS. 5D and 6A, that both groups are the same.

As an alternative, the track format of FIG. 6B can be obtained so as to enable a minus three times $v_n$ trick mode for reproducing arrangements having either the scanner configuration of FIG. 1A, or the scanner configuration of FIG. 1B, or the scanner configuration of FIG. 1C. In a group of 6 tracks, denoted $T_2$ to $T_7$, the hatched portions $P_1$ and $P_2$ in the tracks $T_2$ and $T_3$ are the same as the hatched portions shown in the tracks $T_2$ and $T_3$ in FIG. 5A, and the hatched portion $P_3$ in the track $T_5$ has the same contents as the portion $P_2$ in the track $T_3$. For neighboring groups of 6 tracks, an identical track format is present at the same locations in those groups as in the group shown in FIG. 6B, for the storage of trick mode information, so as to realize a trick mode reproduction at a tape transport speed of minus three times $v_n$. Again, it can be said that, when comparing the groups of 6 tracks shown in FIGS. 5E and 6B, that both groups are the same.

FIG. 7A shows a combination of the formats of FIGS. 5D and 6B, so as to realize both trick modes, that is: the 3 times $v_n$ trick mode and the –3 times $v_n$ trick mode. FIG. 7A shows, again, a group of 6 tracks $T_a$ to $T_f$. The portions denoted $P_{1+}$ to $P_{3+}$ correspond to the portions $P_1$ to $P_3$, respectively, shown in FIG. 5D, and the portions denoted $P_{1-}$ to $P_{3-}$ correspond to the portions $P_1$ to $P_3$, respectively, shown in FIG. 6B. For neighboring groups of 6 tracks, an identical track format is present at the same locations in those groups as in the group shown in FIG. 7A, for the storage of trick mode information, so as to realize a trick mode reproduction at a tape transport speed of plus and minus three times $v_n$.

FIG. 7B shows a combination of the formats of FIGS. 5E and 6A, so as to realize both trick modes, that is: the 3 times $v_n$ trick mode and the –3 times $v_n$ trick mode. FIG. 7B shows, again, a group of 6 tracks $T_a$ to $T_f$. The portions denoted $P_{1+}$ to $P_{3+}$ correspond to the portions $P_1$ to $P_3$, respectively, shown in FIG. 5E, and the portions denoted $P_{1-}$ to $P_{3-}$ correspond to the portions $P_1$ to $P_3$, respectively, shown in FIG. 6A. For neighboring groups of 6 tracks, an identical track format is present at the same locations in those groups as in the group shown in FIG. 7B, for the storage of trick mode information, so as to realize a trick mode reproduction at a tape transport speed of plus and minus three times $v_n$.

It will be evident that also the formats of the FIGS. 5A and 6A, or the formats of the FIGS. 5E and 6B, would have been combined. In that situation, the portions for the forward trick mode and the reverse trick mode do not lie at the same position in the tracks.

Figure 8A:
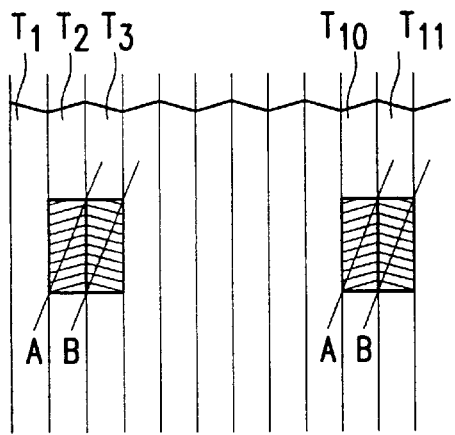
FIGS. 8A to 8E show various track configurations for realizing a $4.v_n$ trick mode.

FIG. 8A shows how the heads A and B of the scanner configuration of FIG. 1A scan the tracks in a trick mode, where the record carrier has a velocity of four times the nominal velocity $v_n$ in, e.g., the forward direction, where $v_n$ is the velocity of the record carrier during reproduction in the normal play mode.

In the 4 times $v_n$ trick mode, the head pair scans the tracks as shown by the path lines denoted A and B. The heads A and B read the information recorded in the hatched portions in the track pairs $T_2$, $T_3$ and $T_{10}$, $T_{11}$, where the head A reads the information stored in the hatched portions in the tracks $T_2$ and $T_{10}$ and the head B reads the information stored in the hatched portions in the tracks $T_3$ and $T_{11}$.

It should be noted here that, if the recording arrangement would have had the scanner configuration as per FIG. 1C, the same track paths would have been present, where the paths crossing the tracks $T_2$, $T_3$ would have been realized by the head pair A1,B1, and the paths crossing the tracks $T_{10}$, $T_{11}$ would have been realized by the head pair A2,B2.

Figure 8B:
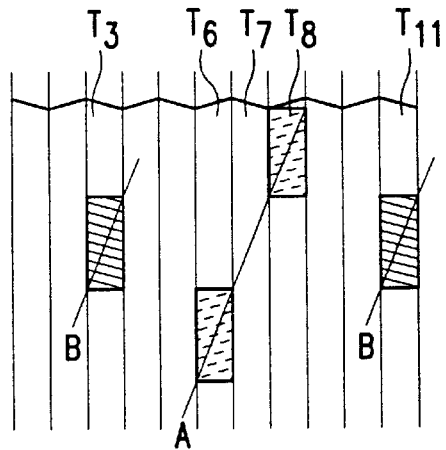

FIG. 8B shows how the heads A and B of the scanner configuration of FIG. 1B scan the tracks in a trick mode, where the record carrier has the velocity of four times the nominal velocity $v_n$. FIG. 8B shows the same tracks as FIG. 8A.

In the 4 times $v_n$ trick mode, the heads A and B scan the tracks as shown by the path lines denoted A and B. The head B reads the information recorded in the hatched portions in the tracks $T_3$ and $T_{11}$. The head A scans the record carrier along the line denoted A, which lies exactly between the lines denoted B in FIG. 8B. The head A cannot read information from the track $T_7$, as the head A has the wrong azimuth for reading information from the track $T_7$. The head A is capable of reading information recorded in the tracks $T_6$ and $T_8$, and can read the information stored in the hatched portions in the tracks $T_6$ and $T_8$, which hatched portions do not lie at the same height (or at the same location) as the hatched portions in the tracks $T_3$ and $T_{11}$.

The following can be said if it is required to read the same information from the record carrier when scanning the record carrier in one revolution of the head drum in the situations of FIGS. 8A and 8B. The hatched portion in the track $T_3$ in FIG. 8A can have the same contents as the hatched portion in the track $T_3$ in FIG. 8B, and the hatched portion in the track $T_{11}$ in FIG. 8A then has the same contents as the hatched portion in the track $T_{11}$ of FIG. 8B. As regards the contents of the hatched portion in the track $T_{10}$ in FIG. 8A and the hatched portions in the tracks $T_6$ and $T_8$ in FIG. 8B, the following can be said. The hatched portion in the track $T_{10}$ in FIG. 8A can have the same contents as either the hatched portion in the track $T_6$ in FIG. 8B (in which case the hatched portion in the track $T_8$ in FIG. 8B is not needed, or can be used to store other information in it), or the hatched portion in the track $T_8$ in FIG. 8B (in which case the hatched portion in the track $T_6$ in FIG. 8B is not needed, or can be used to store other information in it). As an alternative, the hatched portions in the tracks $T_6$ and $T_8$ in FIG. 8B can, as an example, be half as long and comprise, together, the same information as stored in the hatched portion in the track $T_{10}$ in FIG. 8A.

Figure 8C:
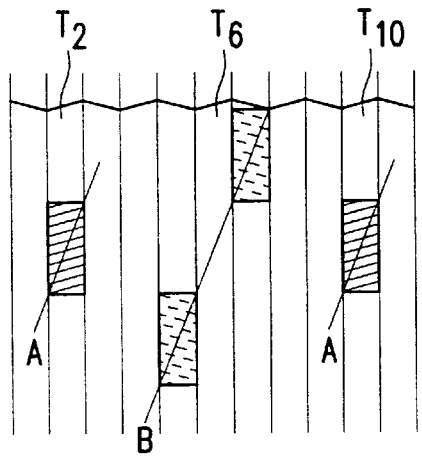

FIG. 8C shows, in fact, the same situation as FIG. 8B, except for the fact that the hatched portions in the tracks $T_2$ and $T_{10}$ read by the head A are taken as a kind of reference. The head B now scans the record carrier along the line denoted B, which lies exactly between the lines denoted A in FIG. 8C. The head B cannot read information from the track $T_6$ as the head B has the wrong azimuth for reading information from the track $T_6$. The head B is capable of reading information recorded in the tracks $T_5$ and $T_7$, and can read the information stored in the hatched portions in the tracks $T_5$ and $T_7$, which hatched portions do not lie at the same height (or at the same location) as the hatched portions in the tracks $T_2$ and $T_{10}$.

The following can be said if it is required to read the same information from the record carrier when scanning the record carrier in one revolution of the head drum in the situations of FIGS. 8A and 8C. The hatched portion in the track $T_2$ in FIG. 8A can have the same contents as the hatched portion in the track $T_2$ in FIG. 8C, and the hatched portion in the track $T_{10}$ in FIG. 8A then has the same contents as the track portion in the track $T_{10}$ in FIG. 8C. Now the following can be said about the contents of the track portions in the track $T_3$ in FIG. 8A and the tracks $T_5$ and $T_7$ in FIG. 8C. The hatched portion in the track $T_3$ in FIG. 8A can have the same contents as either the hatched portion in the track $T_5$ (in which case the hatched portion in the track $T_7$ is not needed, or can be used to store other information in it), or the hatched portion in the track $T_7$ in FIG. 8C (in which case the hatched portion in the track $T_5$ is not needed, or can be used to store other information in it). As an alternative, the hatched portions in the tracks $T_5$ and $T_7$ in FIG. 8C can, as an example, be half as long and comprise, together, the same information as stored in the hatched portion in the track $T_3$ in FIG. 8A.

Figure 8D:
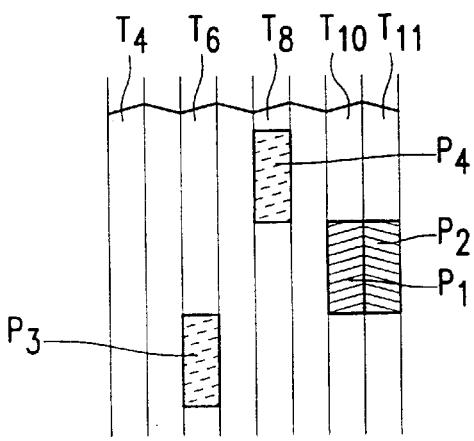

The situations of the FIGS. 8A and 8B can be combined so as to enable a four times $v_n$ trick mode for reproducing arrangements having either the scanner configuration of FIG. 1A, or the scanner configuration of FIG. 1B, or the scanner configuration of FIG. 1C. This results in the track format as shown in FIG. 8D. In a group of 8 tracks, denoted $T_4$ to $T_{11}$, the hatched portions $P_1$ and $P_2$ in the tracks $T_{10}$ and $T_{11}$ are the same as the hatched portions shown in the tracks $T_{10}$ and $T_{11}$ in FIG. 8A, and the hatched portions $P_3$ and $P_4$ in the tracks $T_6$ and $T_8$, respectively, correspond to the hatched portions shown in the tracks $T_6$ and $T_8$, respectively, in FIG. 8B.

What has been said earlier in relation to the hatched portions in the tracks $T_6$ and $T_8$ in FIG. 8B, is thus equally valid for the hatched portions $P_3$ and $P_4$ in FIG. 8D. That is: the hatched portion $P_1$ in the track $T_{10}$ has the same contents as either the hatched portion $P_3$ in the track $T_6$ (in which case the hatched portion $P_4$ in the track $T_8$ is not needed, or can be used to store other information in it), or the hatched portion $P_4$ in the track $T_8$ (in which case the hatched portion $P_3$ in the track $T_6$ is not needed, or can be used to store other information in it). As an alternative, the hatched portions $P_3$ and $P_4$ in the tracks $T_6$ and $T_8$ in FIG. 8D can, as an example, be half as long and comprise, together, the same information as stored in the hatched portion $P_1$ in the track $T_{10}$. For neighboring groups of 8 tracks, an identical track format is present at the same locations in those groups as in the group shown in FIG. 8D, for the storage of trick mode information, so as to realize a trick mode reproduction at a tape transport speed of four times $v_n$.

Figure 8E:
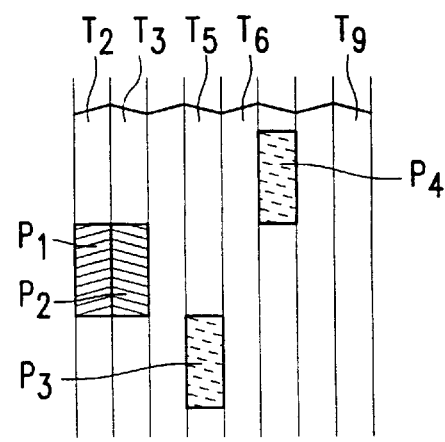

As an alternative, the situations of the FIGS. 8A and 8C can be combined so as to enable a four times $v_n$ trick mode for reproducing arrangements having either the scanner configuration of FIG. 1A, or the scanner configuration of FIG. 1B, or the scanner configuration of FIG. 1C. This results in the track format as shown in FIG. 8E. In a group of 8 tracks, denoted $T_2$ to $T_9$, the hatched portions $P_1$ and $P_2$ in the tracks $T_2$ and $T_3$ are the same as the hatched portions shown in the tracks $T_2$ and $T_3$ in FIG. 8A, and the hatched portions $P_3$ and $P_4$ in the tracks $T_5$ and $T_7$ correspond to the hatched portions shown in the tracks $T_5$ and $T_7$ in FIG. 8C. What has been said earlier in relation to the hatched portions in the tracks $T_5$ and $T_7$ in FIG. 8C, is thus equally valid for the hatched portions $P_3$ and $P_4$ in FIG. 8E. That is: the hatched portion $P_2$ in the track $T_3$ has the same contents as either the hatched portion $P_3$ in the track $T_5$ (in which case the hatched portion $P_4$ in the track $T_7$ is not needed, or can be used to store other information in it), or the hatched portion $P_4$ in the track $T_7$ (in which case the hatched portion $P_3$ in the track $T_5$ is not needed, or can be used to store other information in it). As an alternative, the hatched portions $P_3$ and $P_4$ in the tracks $T_5$ and $T_7$, respectively, in FIG. 8E can, as an example, be half as long and comprise, together, the same information as stored in the hatched portion $P_2$ in the track $T_3$. For neighboring groups of 8 tracks, an identical track format is present at the same locations in those groups as in the group shown in FIG. 8E, for the storage of trick mode information, so as to realize a trick mode reproduction at a tape transport speed of four times $v_n$.

The same exercise as has been carried out with reference to FIGS. 3A–3E, for the minus 2 times $v_n$ trick mode, can be carried out for the minus 4 times $v_n$ trick mode. The results are shown in FIGS. 9A and 9B.

Figure 9A:
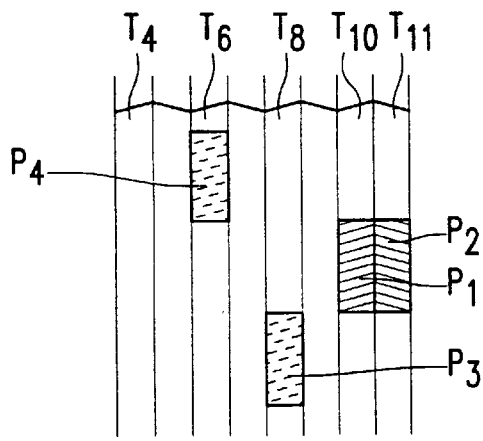
FIGS. 9A and 9B show track configurations for realizing a $-4.v_n$ trick mode.

In order to enable a minus four times $v_n$ trick mode for reproducing arrangements having either the scanner configuration of FIG. 1A, or the scanner configuration of FIG. 1B, or the scanner configuration of FIG. 1C, a track format as shown in FIG. 9A can be used. In a group of 8 tracks, denoted $T_4$ to $T_{11}$, the hatched portions $P_1$ and $P_2$ in the tracks $T_{10}$ and $T_{11}$ are the same as the hatched portions shown in the tracks $T_{10}$ and $T_{11}$ in FIG. 8A. The hatched portion $P_3$ in the track $T_8$ has the same contents as the hatched portion $P_1$ in the track $T_{10}$, in that case, the hatched portion $P_4$ need not be present. The hatched portion $P_4$ in the track $T_6$ has the same contents as the hatched portion $P_1$ in the track $T_{10}$, in that case, the hatched portion $P_3$ need not be present. Or the hatched portions $P_3$ and $P_4$ are both present, and the information contained in the portion $P_1$ is included in both portions $P_3$ and $P_4$, which portions may, therefore, be shorter, viewed in the track direction.

For neighboring groups of 8 tracks, an identical track format is present at the same locations in those groups as in the group shown in FIG. 9A, for the storage of trick mode information, so as to realize a trick mode reproduction at a tape transport speed of minus four times $v_n$.

Figure 9B:
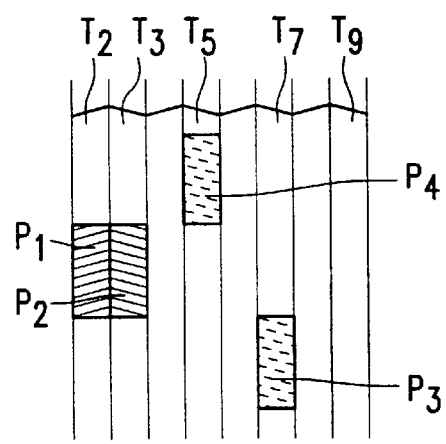

As an alternative, the track format of FIG. 9B can be obtained so as to enable a minus four times $v_n$ trick mode for reproducing arrangements having either the scanner configuration of FIG. 1A, or the scanner configuration of FIG. 1B, or the scanner configuration of FIG. 1C. In a group of 8 tracks, denoted $T_2$ to $T_9$, the hatched portions $P_1$ and $P_2$ in the tracks $T_2$ and $T_3$ are the same as the hatched portions shown in the tracks $T_2$ and $T_3$ in FIG. 8A. The hatched portion $P_3$ in the track $T_7$ has the same contents as the hatched portion $P_2$ in the track $T_3$, in that case, the hatched portion $P_4$ need not be present. The hatched portion $P_4$ in the track $T_5$ has the same contents as the hatched portion $P_2$ in the track $T_2$, in that case, the hatched portion $P_3$ need not be present. Or the hatched portions $P_3$ and $P_4$ are both present and the information contained in the portion $P_2$ is included in both portions $P_3$ and $P_4$, which portions may, therefore, be shorter, viewed in the track direction.

For neighboring groups of 8 tracks, an identical track format is present at the same locations in those groups as in the group shown in FIG. 9B, for the storage of trick mode information, so as to realize a trick mode reproduction at a tape transport speed of minus four times $v_n$.

Figure 10A:
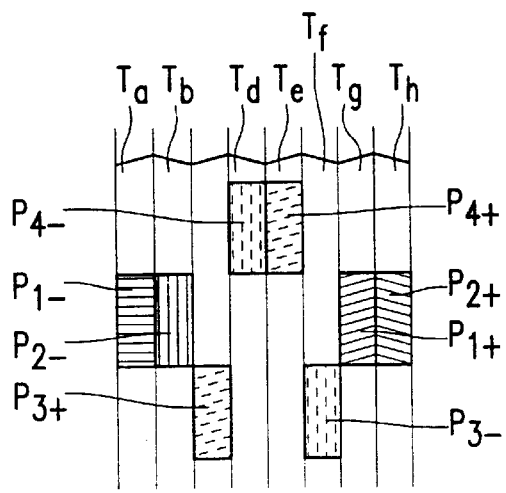
FIGS. 10A to 10C show various track configurations for realizing a $4.v_n$ trick mode and a $-4.v_n$ trick mode.

FIG. 10A shows a combination of the formats of FIGS. 8D and 9B, so as to realize both trick modes, that is: the 4 times $v_n$ trick mode and the −4 times $v_n$ trick mode. FIG. 10A shows, again, a group of 8 tracks $T_a$ to $T_h$. The portions denoted $P_{1+}$ to $P_{4+}$ correspond to the portions $P_1$ to $P_4$, respectively, shown in FIG. 8D, and the portions denoted $P_{1-}$ to $P_{4-}$ correspond to the portions $P_1$ to $P_4$, respectively, shown in FIG. 9B. For neighboring groups of 8 tracks, an identical track format is present at the same locations in those groups as in the group shown in FIG. 10A, for the storage of trick mode information, so as to realize a trick mode reproduction at a tape transport speed of plus and minus four times $v_n$.

Figure 10B:
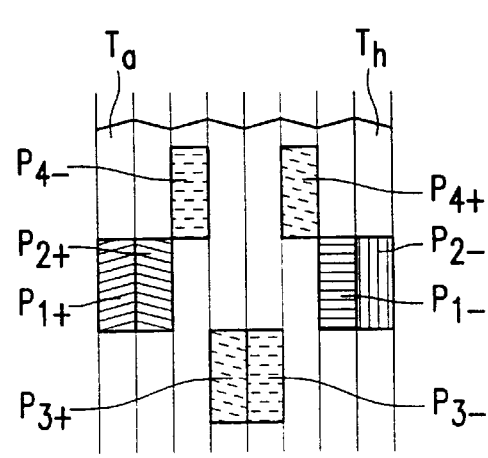

FIG. 10B shows a combination of the formats of FIGS. 8E and 9A, so as to realize both trick modes, that is: the 4 times $v_n$ trick mode and the −4 times $v_n$ trick mode. FIG. 10B shows, again, a group of 8 tracks $T_a$ to $T_h$. The portions denoted $P_{1+}$ to $P_{4+}$ correspond to the portions $P_1$ to $P_4$, respectively, shown in FIG. 8E, and the portions denoted $P_{1-}$ to $P_{4-}$ correspond to the portions $P_1$ to $P_4$, respectively, shown in FIG. 9A. For neighboring groups of 8 tracks, an identical track format is present at the same locations in those groups as in the group shown in FIG. 10B, for the storage of trick mode information, so as to realize a trick mode reproduction at a tape transport speed of plus and minus four times $v_n$.

Figure 10C:
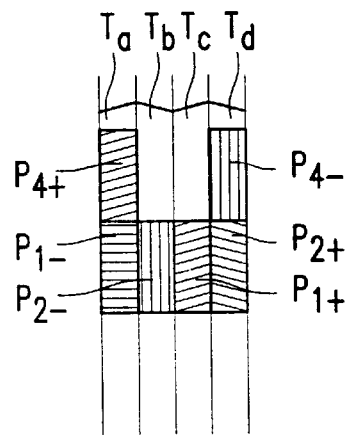

FIG. 10C shows how the group of 8 tracks shown in FIG. 10A can be brought back to a group of 4 tracks by 'shifting' the '+' trick mode information over 4 tracks to the left. Further, it is assumed that all information included in the portion $P_{2-}$ is also included in the portion $P_{4-}$, so that the portion $P_{3-}$ has been left out. In the same way, it is assumed that all information included in the portion $P_{1+}$ is also included in the portion $P_{4+}$, so that the portion $P_{3+}$ has been left out. For neighboring groups of 4 tracks, an identical track format is present at the same locations in those groups as in the group shown in FIG. 10C, for the storage of trick mode information, so as to realize a trick mode reproduction at a tape transport speed of plus and minus four times $v_n$. Further, those groups may contain the same information.

As will be apparent, other formats are also possible for realizing the plus and minus four trick mode.

Without giving a further derivation, it will be clear that for other trick play velocities, a track format can be derived for recording the trick play data in the tracks.

Further, it should be noted that, in order to compensate for inaccuracies in the servo system, which should locate the path of the heads exactly on the portions in the groups, it may be required to repeat the trick mode information that must be stored in a track portions in a track a number of times, so that also in the case of an less accurate positioning the heads will always read the trick mode information from the track portions.

Figure 11:
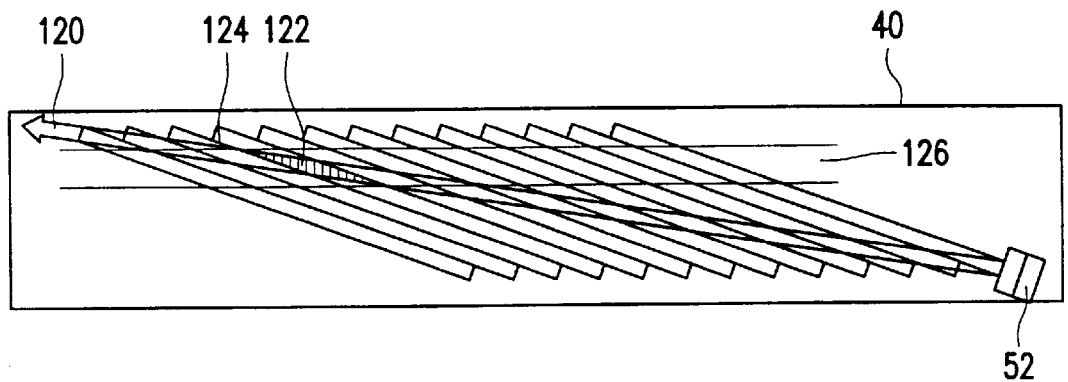
FIG. 11 shows the location of the trick mode information in the tracks on a record carrier.

FIG. 11 shows the record carrier 40 having a number of slant tracks recorded on it. FIG. 11 also shows a path, denoted by the reference numeral 120, via which path one of the reading heads denoted 52 scans the record carrier in a trick mode. When scanning the record carrier along the path 120, the head 52, which head has one of the two azimuth angles, will be able to read information from only the even numbered or only the odd numbered tracks.

In order to enable a reproduction of video information during a trick play mode, especially in the case of video information being recorded in a data reduced form, it is required to add special trick play information in special locations in the tracks such that those locations are scanned by the head 52 for the various transport speeds for the record carrier that are possible in a trick play mode. This trick play information is special video information recorded in addition to the normal play video information that has been recorded in the tracks. As a consequence some portion of a track, such as the portion 122 in the track 124, comprise this trick play information, which should be scanned and read by the head 52 in the trick play mode. More specifically, a band denoted 126, which runs in the longitudinal direction of the record carrier 40, is formed having the trick mode information, in the form of the groups described above, included in the tracks.

It should be noted here that the video data recorded in the tracks for the normal playback mode comprises data reduced video information. In the case that the video data is MPEG video data, it should be noted that, to realize such data reduced video information the information corresponding to one picture is intraframe encoded so as to obtain so called I-frames. A higher data reduction can be obtained by carrying out an interframe encoding on two pictures, resulting in an I-frame for the first picture and a P-frame for the second picture. For recreating the two pictures, an intraframe decoding, inverse to the intraframe encoding, must be carried out on the I-frame information, so as to regenerate the first picture, and an interframe decoding, inverse to the interframe encoding, must be carried out using both the I-frame information and the P-frame information, so as to regenerate the second picture. Thus, the normal play video data recorded in the tracks comprise information relating to sequences of I and P frames. Further, B frames are present in the sequence, which B frames, in the same way as the P frames, cannot be decoded on its own but need information from other pictures. For a further description of the MPEG information signal standard, reference is made to Reference (4) in the List of References.

Figure 12:
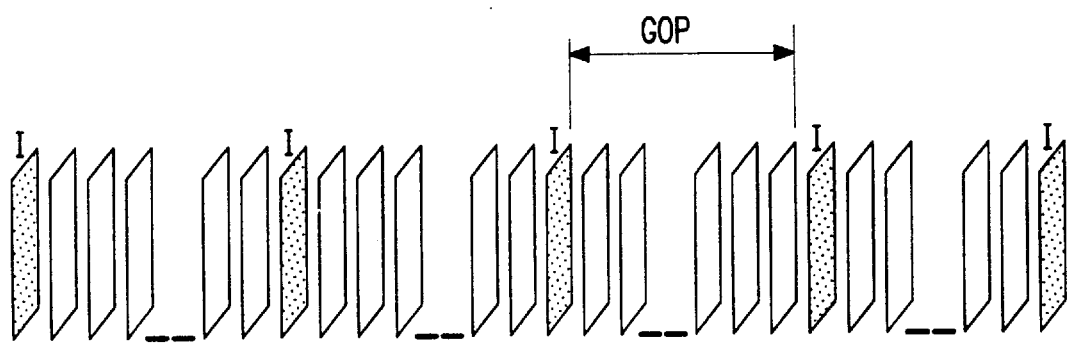
FIG. 12 shows a sequence of I, B and P frames in an MPEG video datastream.

FIG. 12 shows a sequence of pictures, as encoded so as to obtain an MPEG video signal. The pictures indicated by an 'I' are the intraframe encoded pictures. An intraframe encoded I picture and the interframe encoded P and B pictures that follow the intraframe encoded I picture are called a group of pictures (GOP), a well known defined item in MPEG encoding of video signals. During 'normal play' processing, all the pictures shown in FIG. 12 are processed for recording on the record carrier as 'normal play' data.

In a trick mode, as an example, only I-frame information, if needed in a further data-reduced form, are used as the trick mode information for recording in the portions in the tracks.

Figure 13:
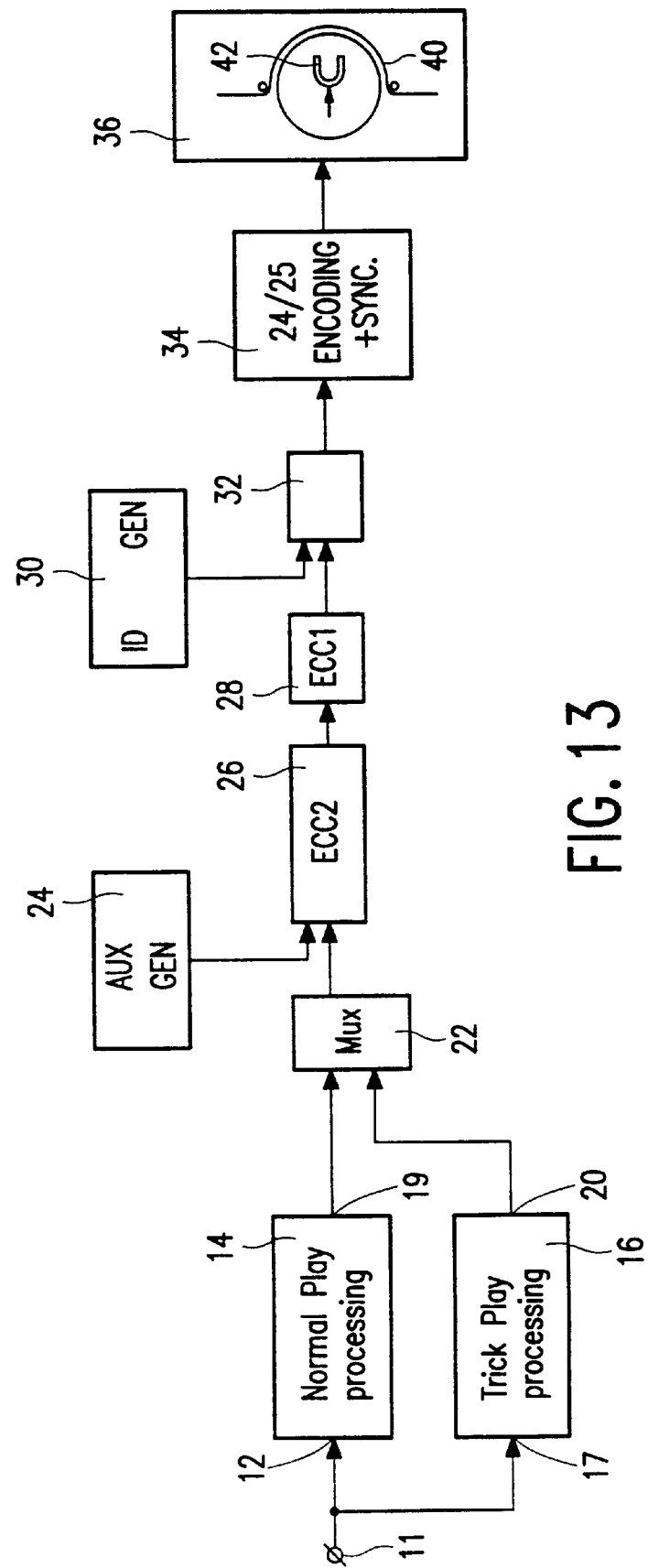
FIG. 13 is a block diagram of an embodiment of a recording arrangement.

FIG. 13 shows, schematically, an embodiment of the recording arrangement. The recording arrangement comprises an input terminal 11 for receiving the MPEG serial datastream for recording in the tracks. The input terminal 11 is coupled to an input 12 of a 'normal play' processing unit 14. Further, a 'trick play' processing unit 16 is provided having an input 17 also coupled to the input terminal 11. Outputs 19 and 20 of the 'normal play' processing unit 14 and the 'trick play' processing unit 16 are coupled to corresponding inputs of a multiplexer 22.

An auxiliary signal generator 24 is present for supplying the auxiliary signal information for storage in the tracks. Outputs of the multiplexer 22 and the generator 24 are coupled to corresponding inputs of an error correction encoder unit 26. The error correction encoder unit 26 is capable of carrying out an error correction encoding step, denoted ECC2. Next, an error correction encoding step, denoted ECC1, is carried out in an error correction encoder unit 28.

The recording arrangement further comprises a generator 30 for adding the ID information, for adding subcode information. After combination of the signals in the combining unit 32, the combined signal is applied to a unit 34, in which an encoding is carried out where, each time, 24-bit words of the incoming bitstream are converted into 25-bit words, where sync information is added.

The 24-to-25 encoding carried out in the encoding unit 34 is well known in the art. Reference is made in this respect to U.S. Pat. No. 5,142,421, Reference (5) in the List of References. This patent also describes a way of adding the sync information to the datastream.

An output of the encoding unit 34 is coupled to an input of a writing unit 36, in which the datastream obtained with the encoding unit 34' is recorded in the slant tracks on the record carrier, by means of at least two write heads. The writing unit 36 has one of the scanner configurations shown in FIGS. 1A to 1C.

The error correction encoding steps, denoted ECC1 and ECC2, are needed so as to enable an error detection and correction in the reproducing arrangement to be discussed later.

No further description of the 'normal play' processing unit 14 will be given, as such description is not relevant for the explanation of the present invention. It should however be noted that U.S. Pat. No. 5,579,183, Reference (6) in the List of References, which corresponds to published International Application No. WO 95/27,978, gives an extensive description of the recording arrangement as far as the 'normal play' processing during recording of an MPEG information signal is concerned. This patent is therefore incorporated herein by reference.

Before a further description of the 'trick play' processing unit 16 of the recording arrangement of FIG. 13 will be given, first, a schematic description of the reproducing arrangement will be given.

Figure 14:
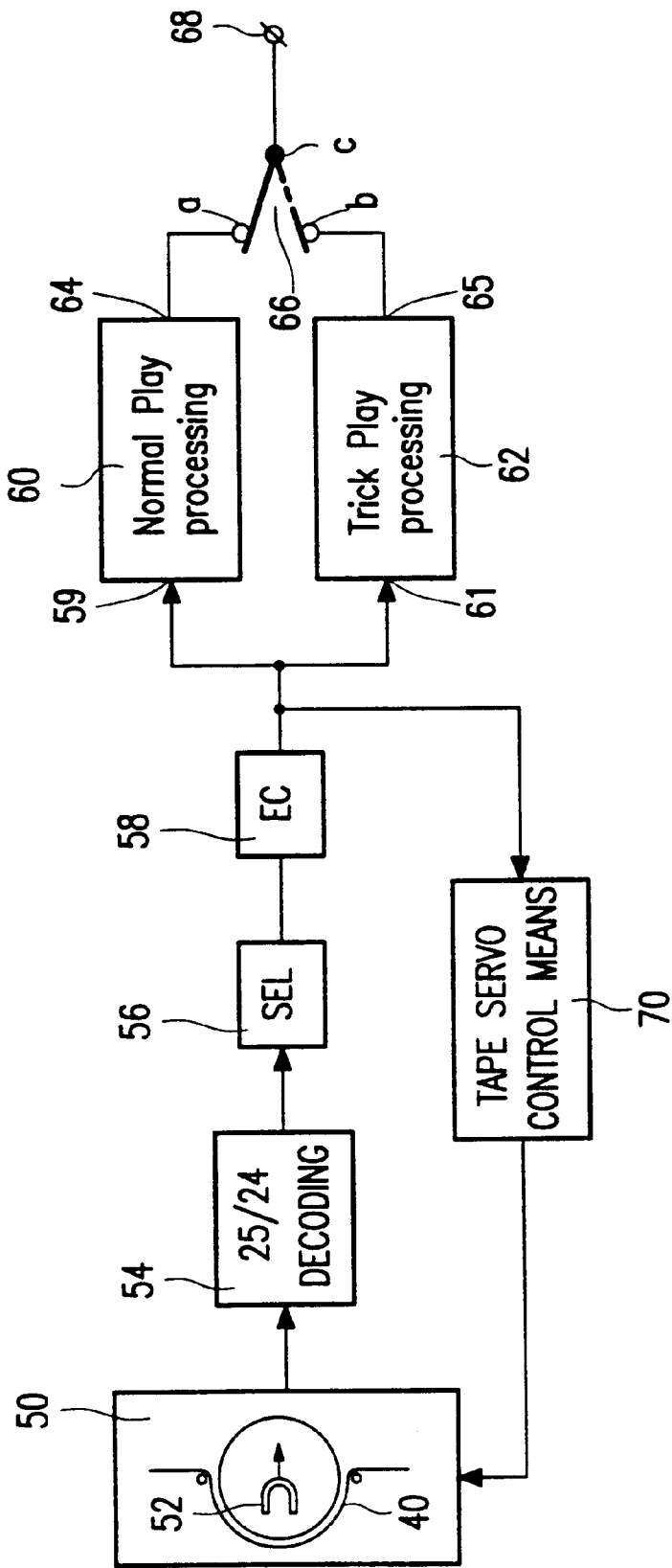
FIG. 14 is a block diagram of an embodiment of a reproducing arrangement.

FIG. 14 shows, schematically, an embodiment of a reproduction arrangement for reproducing information from the record carrier 40 obtained with the recording arrangement of FIG. 13. The reproduction arrangement comprises a reading unit 50, having at least two reading heads in accordance with one of the scanner configurations of FIGS. 1A to 1C, for reading information from the slant tracks on the record carrier 40. An output of the reading unit 50 is coupled to an input of a decoding unit 54, which carries out a 25-to-24 decoding on the signal read out, so as to convert 25-bit words in the incoming datastream into 24-bit words. Next, after having selected out in the selector unit 56 all those information that is not required for recreating a replica of the original MPEG datastream, an error correction is carried out in the error correction unit 58. It will be clear that the error correction carried out has two steps. One error correction step based on the ECC1 and one step based on ECC2.

The output terminal of the error correction unit 58 is coupled to an input of a 'normal play' processing unit 60. Further, a 'trick play' processing unit 62 is provided having an input also coupled to the output of the error correction unit 58. Outputs 64 and 65 of the 'normal play' processing unit 60 and the 'trick play' processing unit 62 are coupled to corresponding terminals a and b, respectively, of a switch 66, a c-terminal of which is coupled to an output terminal 68. If the reproducing arrangement is switched into a 'normal play' reproduction mode, this means that the record carrier is transported at a nominal speed, that the 'normal play' processing unit 60 is enabled, and the switch 66 is switched into the position a-c. If the reproducing arrangement is switched into a 'trick play' reproduction mode, also called 'feature mode', this means that the record carrier is transported at a speed other than the nominal speed, that the 'trick play' processing unit 62 is enabled, and the switch 66 is switched into the position b-c.

For enabling a 'trick play' reproduction mode, the reproducing arrangement is further provided with a tape servo control means 70 which generates a control signal for controlling the speed of the record carrier 40. More specifically, the control means 70 generates a control signal during the 'trick play' reproduction mode for transporting the record carrier 40 such that a head pair A,B exactly crosses the hatched portions in the track pairs $T_2$, $T_3$; $T_{10}$, $T_{11}$, . . . , etc., such as in the example of FIG. 8A and with a scanner configuration as per FIG. 1B, the pair of heads A,B exactly crosses the hatched portions in the track pairs $T_3$, $T_6/T_8$; . . . , etc. A further explanation of the functioning of the servo control means 70 will be given below with reference to FIG. 16.

It should also be noted that the previously mentioned Reference (6) of the List of References gives an extensive description of the reproducing arrangement as far as the 'normal play' processing during reproducing of an MPEG information signal is concerned.

In Reference (6) in the List of References, an explanation has been given how the 'normal play' data supplied by the 'normal play' processing unit 14 has been stored in a track on the record carrier, such as a record carrier of the DVC type, by means of a recording arrangement, such as of the DVC type.

Figure 15:
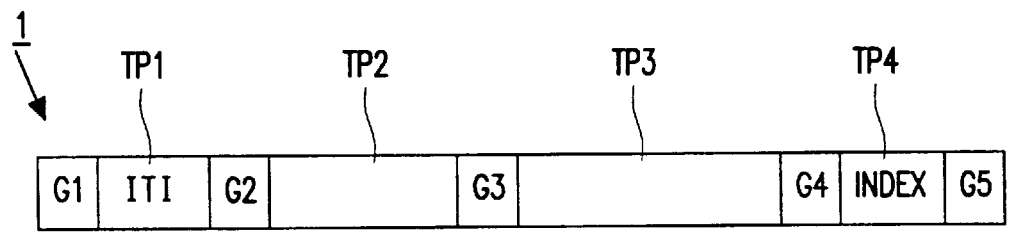
FIG. 15 shows the format of a track on the record carrier.

More specifically, FIG. 15 shows the format of a track 1 on the record carrier. The left end of the track 1 in FIG. 15 is the start of the track and the right end of the track is the terminal part of the track. The track comprises a number of track parts. The track part denoted by G1 is the pre-amble track part. An example of the preamble track part G1 has been described extensively in Reference (1) in the List of References.

The track part G1 is followed by tracking tone recording part TP1, which is denoted by ITI (insert timing information) track part and which contains a tracking tone, synchronization information and identification (or timing) information. Further explanation of the contents of the ITI track can be found in Reference (3) in the List of References.

The track part TP1 is followed by an edit gap G2. The edit gap G2 is followed by the track part TP2, which is in accordance with the DVC format the audio signal recording sector and comprises digital audio information. In Reference (6), it is shown that this track part contains parity information. The edit gap G3 is followed by a track part TP3 which is, in accordance with the DVC format, the video signal recording sector and comprises digital video information. In Reference (6), it is shown that the information generated by the 'normal play' processing unit 14 and the 'trick play' processing unit 16 is stored in this track part. The edit gap G4 is followed by a track part TP4, denoted by INDEX, and which comprises, among others, subcode information, such as absolute and/or relative time information and a table of contents (TOC). The track is terminated by the track part G5. It can be said that the sequence order in which the parts TP1, TP2 and TP3 occur in the tracks may be different.

Figure 16:
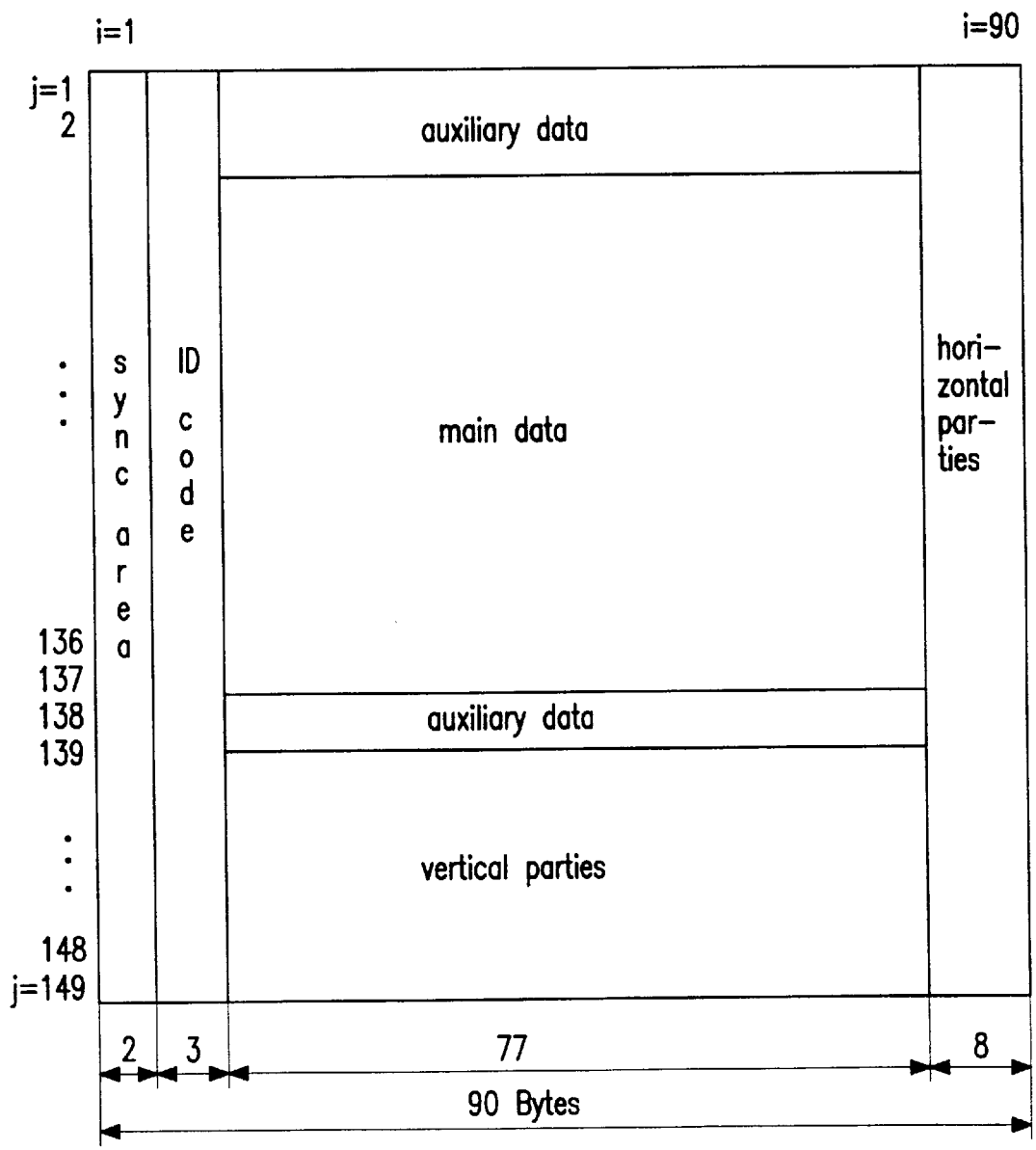
FIG. 16 shows the contents of one of the track parts in the track of FIG. 15.

The contents of the sector TP3 is given in FIG. 16. FIG. 16 in fact shows, schematically, a number of 149 horizontal lines, denoted by j=1 to j=149, having bytes of information stored in it. The 149 lines are, in fact, 149 signal blocks (or sync blocks) that are stored sequentially in the recording sector TP3. 90 bytes of information, denoted by i=1 to i=90, are stored in each signal block.

The first two bytes (i=1 and i=2) of each signal block form a synchronization pattern of 2 bytes long. The following three bytes in each signal block form an ID code, comprising, among others, information which indicates the sequence number of the signal block in the recording part TP3. The last eight bytes in the signal blocks form horizontal parity information. Vertical parity information is stored in the storage locations i=6 to i=82, inclusive, of the last 11 signal blocks.

In accordance with the present invention, bytes of 'normal play' information generated by the 'normal play' processing unit 14 and bytes of 'trick play' information generated by the 'trick play' information unit 16 and encoded in the encoder 34 are stored in the storage locations i=6 to i=82 inclusive of the signal blocks having the sequence numbers j=3 to j=137 inclusive. Bytes of auxiliary data are stored in the storage locations i=6 to i=82 inclusive of the signal blocks having the sequence numbers j=1, 2 and 138. The signal blocks are stored sequentially in the track part TP3, starting with the signal block denoted y=1, followed by the signal block denoted j=2, and so on until the signal block denoted j=149.

The auxiliary data for storage in the signal blocks denoted j=1, 2 and 138 can be teletext data or control data.

It should be noted here that it can be specified that the auxiliary data will be stored in a different location in the memory. Reference is made in this respect to Reference (1), FIG. 13, where the auxiliary data is stored in the memory part denoted by III.

More specifically, a sync block contains either 'normal play' information or 'trick play' information. Reference (6) extensively describes the storage of the 'normal play' information in the signal (or sync) blocks.

The invention now aims at storing the 'trick play' information in the signal blocks.

Only 77 bytes, denoted by i=6 to 82, in the signal blocks denoted by j=3 to 137, are available for the storage of the 'trick play' information generated by the 'trick play' information generated by the 'trick play' processing unit 16. From Reference (6), it can be understood that the first two bytes in each signal block are reserved for the insertion of all kinds of additional data, such as, a signal block numbering and/or an identification identifying the signal block as containing either 'normal play' information or 'trick play' information. So, 75 bytes remain available in each signal block. The 'trick play' information could thus be stored in a number of those signal blocks that are located in the track portions identified above with reference to the FIGS. 2A–2E, 3A–3E, 4A–4C, 5A–5E, 6A–6B, 7A–7B, 8A–8E, 9A–9B and 10A–10C.

It should be noted that, during reproduction in a trick mode, no full blocks of data, as shown in FIG. 16, can be read out of a track during a scan by a read head across said track. Only a number of directly succeeding signal blocks can be read out in such a situation. As a consequence, no error correction using the vertical parity information can be carried out during a trick mode. Only the 8 horizontal parity bytes in each signal block can be used to carry out an error correction, which error correction is, however, less powerful than if an error correction on the horizontal and vertical parity bytes would have been carried out.

In order to further protect the 'trick play' information against errors that can occur during the recording and a subsequent reproduction step, an additional error correction encoding step is carried out on the 'trick play' information so as to obtain an error protection encoded 'trick play' information signal. This additional error correction encoding step will be explained hereunder with reference to FIGS. 17, 18 and 19.

First of all, a further explanation of the servo control means 70 of FIG. 14 will given. As has been said above, during read out in a trick mode, only a number of signal blocks stored in the track portion TP3 can be read, so that only an error correction in a signal block based on the horizontal parity bytes in said block can be carried out. This results in an indication whether the trick mode information contained in the signal block is correct. If so, the ID information contained in the bytes i=3,4 and 5 of the signal block, see FIG. 16, is detected by the servo control means 70. In the ID information is included a track number information and a signal block number information. The servo means 70 can thus identify in which track and in which location in a track the signal block just read out lies. The servo control means further has information in what tracks and in what signal blocks in a track the trick mode information is stored. As a result, when the track number and the signal block number do not coincide with the required track number and signal block number, the transport speed is controlled such that the correct tracks and the correct signal block are read out.

Figure 17:
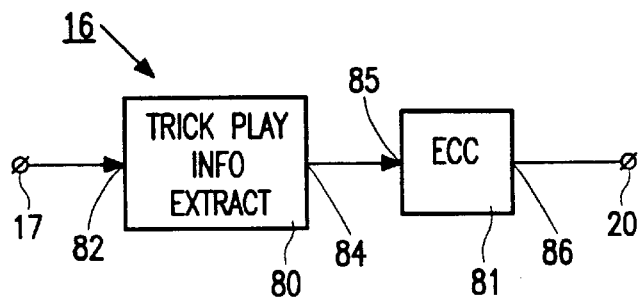
FIG. 17 is a block diagram of an embodiment of the 'trick play' processing unit in the recording arrangement of FIG. 13.

FIG. 17 shows, schematically, an embodiment of the 'trick play' processing unit 16 of the recording arrangement of FIG. 13, which has its input 17 coupled to an input 82 of a 'trick play' information extraction unit 80, an output 84 of which is coupled to an input 85 of an error correction encoding unit 81. An output 86 of the error correction encoding unit 81 is coupled to the output 20 of the unit 16. The unit 80 is adapted to extract the 'trick play' information from the information signal, that is, e.g., the MPEG information signal, that is supplied to the input 17. This means that, as explained earlier, the I frames are extracted from the MPEG information stream. The error correction encoding unit 81 carries out an error correction encoding on the 'trick play' information. The error correction encoded 'trick play' information signal is supplied to the output 20 and will be stored in the 75 bytes of a number of signal blocks.

Figure 18:
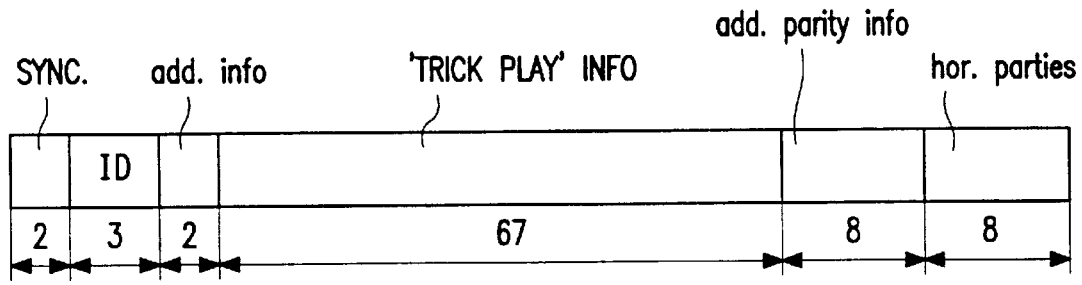
FIG. 18 shows the contents of a signal block comprising error correction encoded 'trick play' information.

Two possible error correction encodings that can be carried out in the error correction encoding unit 81 will be discussed. In the first error correction encoding, an error correction encoding is carried out on, e.g., 67 bytes of 'trick play' information that will be stored in a signal block so as to obtain (in this case) 8 additional parity bytes, see FIG. 18. FIG. 18 shows the contents of one signal block, that is the contents of one horizontal line in the FIG. 16. The 77 bytes available in each signal block are now filed by the 2 bytes discussed earlier that contain additional identification information, next 67 bytes of 'trick play' information, and the 8 additional parity bytes.

Figure 19:
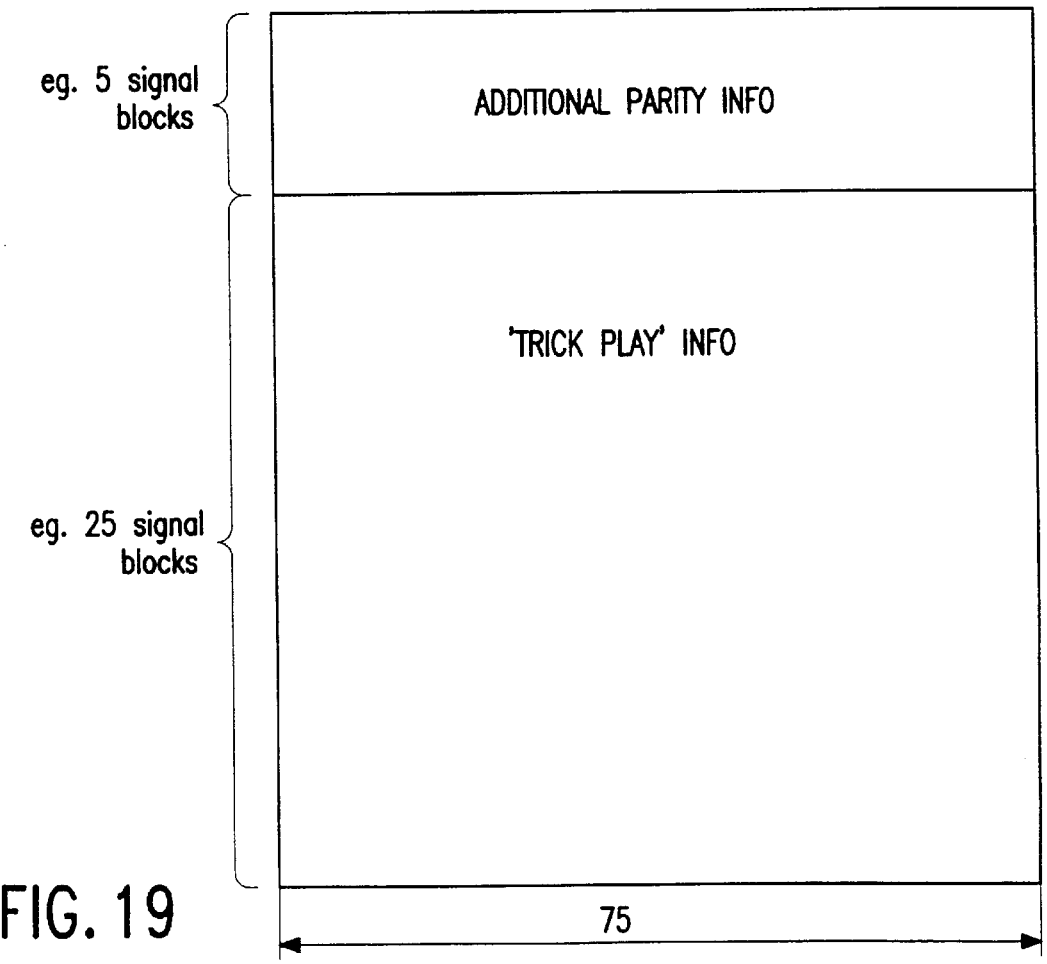
FIG. 19 shows another error correction encoding on the 'trick play' information.

Another way of error correction encoding is explained with reference to FIG. 19. FIG. 19 shows a sequence of (in this example) 25 signal blocks having 75 bytes of 'trick play' information stored in each of them. In the vertical direction in FIG. 19, an error correction encoding step is carried out resulting in (in this example) 5 signal blocks of additional parity information. This sequence of 30 signal blocks are now stored in the track portions discussed above. It should be noted that the sequence of 30 signal blocks can be stored in different track portions, as long as during a 'trick play' mode all the information can be reproduced.

Figure 20:
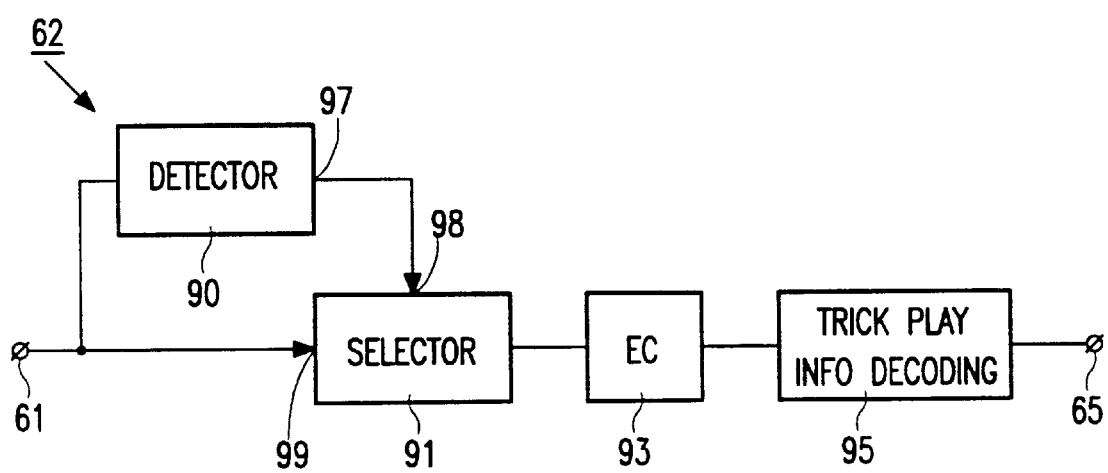
FIG. 20 is a block diagram of an embodiment of the 'trick play' processing unit in the reproducing arrangement of FIG. 14.

FIG. 20 shows an embodiment of the 'trick play' processing unit 62 of the reproducing arrangement of FIG. 14. Its input 61 is coupled to inputs of a detector unit 90 and a selector unit 91. The detector unit 90 is adapted to detect identification information included in the two bytes in the signal blocks, identified in FIG. 18 as 'add. info', which identification information identifies signal blocks as comprising either 'normal play' data or 'trick play' data. This identification signal is extensively discussed in Reference (6). In response to the detection of a signal block as comprising 'trick play' information, the detector 90 generates a detection signal at its output 97, which detection signal is supplied to a control signal input 98 of the selection unit 91. In response to the reception of this detection signal, the selection unit 91 selects the signal blocks comprising the 'trick play' information from the datastream applied to its input 99, and supplies the so selected signal blocks to an output which is coupled to an input of an error correction unit 93, which carried out an error detection and correction step on the data applied to its input under the influence of the additional parity information shown in FIG. 18 or FIG. 19. The error corrected 'trick play' data is supplied to a 'trick play' decoding unit 95 in which picture information is retrieved from the information received for display in the trick play mode.

LIST OF REFERENCES (1) European Patent Application No. 492,704, corresponding to U.S. Pat. No. 5,245,483 (PHN 13.546)
(2) European Patent Application No. 93.202.950, corresponding to U.S. Pat. No. 5,424,878 (PHN 14.241)
(3) European Patent Application No. 93.201.263, corresponding to U.S. Pat. No. 5,400,187 (PHN 14.449)
(4) Grand Alliance HDTV System Specification, Draft document, Feb. 22, 1994.
(5) U.S. Pat. No. 5,142,421 (PHN 13.537)
(6) U.S. Pat. No. 5,579,183 (PHN 14.818)
(7) U.S. Pat. No. 5,109,271 (PHN 12.975)
(8) European Patent Application No. 509,594, corresponding to U.S. patent application Ser. No. 08/734,712, filed Oct. 21, 1996 (PHN 13.668)
(9) Belgian patent application No. 93.00.746, corresponding to U.S. Pat. No. 5,646,692 (PHN 14.515)

We claim:

1. A recording arrangement for recording a digital video signal in tracks on a record carrier, the arrangement comprising:

input means for receiving the digital video signal;

trick play signal generating means coupled to said input means for deriving a trick play signal from the digital video signal;

error correction encoding means for carrying out an error correction encoding step on the digital video signal and the trick play signal; and writing means for writing error correction encoded data in the tracks, characterized in that the error correction encoding means comprises:

a first error correction encoding stage coupled to an output of the trick play signal generating means for carrying out a first error correction encoding step on a block of trick play data comprised in the trick play signal, the first error correction encoding stage adding first parity words to the block of trick play data to form an error correction encoded block of trick play data; and a second error correction encoding stage coupled to said input means and to an output of said first error correction encoding stage for carrying out a second error correction encoding step on a block of data comprised in the digital video signal from said input means, and on the error correction encoded block of trick play data from said first error correction encoding stage, the second error correction encoding stage combining the block of data of the digital video signal and the error correction encoded block of trick play data to form a composite block of data, said second error correction encoding stage further adding second parity words to the composite block of data to form an error correction encoded composite block of data, wherein said writing means writes in the tracks error correction encoded composite blocks of data formed by said second error correction encoding stage.

2. The recording arrangement as claimed in claim 1, wherein the first parity words added by the first error correction encoding stage to the block of trick play data to form said error correction encoded block of trick play data, are in the form of horizontal parity words.

3. The recording arrangement as claimed in claim 2, wherein a block of trick play data is formed of N1 rows and N2 columns of trick play data words, and wherein the first error correction encoding stage adds N3 columns of first parity words to each row in the block of trick play data to form said error correction encoded block of trick play data formed of N1 rows and N2+N3 columns of data words, N1, N2 and N3 being integers larger than 1.

4. The recording arrangement as claimed in claim 1, wherein the first parity words added by the first error correction encoding stage to the block of trick play data to form said error correction encoded block of trick play data, are in the form of vertical parity words.

5. The recording arrangement as claimed in claim 1, 2 or 4, wherein the second parity words added by the second error correction encoding stage to the composite block of data to form said error correction encoded composite block of data, are in the form of horizontal and vertical parity words.

6. The recording arrangement as claimed in claim 4, wherein a block of trick play data is formed of N1 rows and N2 columns of trick play data words, and wherein the first error correction encoding stage adds N3 rows of first parity words to each column in the block of trick play data to form said error correction encoded block of trick play data, N1, N2 and N3 being integers larger than 1.

7. The recording arrangement as claimed in claim 3 or 6, wherein the second error correction encoding stage combines the block of data of the digital video signal and the error correction encoded block of trick play data to form said composite block of data formed of N4 rows and N5 columns of data words, said second error correction encoding stage adding N6 second parity words to each column in the composite block of data, and N7 second parity words to each row in the composite block of data to form said error correction encoded composite block of data formed of N4+N6 rows and N5+N7 columns of data words.

8. The recording arrangement as claimed in claim 1, wherein the digital video signal is an MPEG encoded video signal, the trick play signal generating means retrieving intraframe encoded picture information from the digital video signal to derive the trick play signal therefrom.

9. A method of recording a digital video signal in tracks on a record carrier, the method comprising the steps:
   receiving the digital video signal;
   deriving a trick play signal from the digital video signal;
   carrying out an error correction encoding on the digital video signal and the trick play signal; and
   writing error correction encoded data in the tracks, characterized in that the error correction encoding step comprises the sub-steps:
   (a) carrying out a first error correction encoding sub-step on a block of trick play data comprised in the trick play signal, first parity words being added to the block of trick play data in said first error correction encoding sub-step to form an error correction encoded block of trick play data; and
   (b) carrying out a second error correction encoding sub-step both on a block of data comprised in the digital video signal and on the error correction encoded block of trick play data by
      (i) combining the block of data of the digital video signal and the error correction encoded block of trick play data to form a composite block of data; and
      (ii) adding second parity words to the composite block of data to form an error correction encoded composite block of data,
   wherein said writing step comprises writing said error correction encoded composite blocks of data in the tracks.

10. A reproducing arrangement for reproducing a digital video signal from a track on a record carrier, the arrangement comprising:
   reading means for reading a reproduction signal from the record carrier;
   error correction decoding means coupled to an output of said reading means for carrying out an error correction decoding step on the reproduction signal from the record carrier to form error corrected blocks of data;
   normal play signal processing means coupled to an output of said error correction decoding means for processing error corrected blocks of data;
   trick play signal processing means coupled to an output of said error correction decoding means for processing error corrected blocks of trick play data included in said error corrected blocks of data; and
   output means coupled to said normal play signal processing means and to said trick play signal processing means for supplying blocks of data as the digital video signal when the reproducing arrangement is in a normal play reproduction mode, and for supplying blocks of trick play data as the digital video signal when the reproducing arrangement is in a trick play reproduction mode,
      characterized in that said trick play signal processing means comprises means for detecting and separating error correction encoded blocks of trick play data from said error corrected blocks of data, and said error correction decoding means comprises:
      first error correction decoding means for carrying out an error correction decoding step on error correction encoded composite blocks of data comprised in the reproduction signal, said first error correction decoding means using second parity words comprised in the error correction encoded composite blocks of data to form error corrected blocks of data of the reproduction signal; and
      second error correction decoding means coupled to an output of said detecting and separating means of said trick play signal processing means for carrying out an error correction decoding step on error correction encoded blocks of trick play data retrieved from the reproduction signal, said second error correction decoding means using first parity words comprised in the error correction encoded blocks of trick play data to form error corrected blocks of trick play data.

11. The reproducing arrangement as claimed in claim 10, wherein the second error correction decoding means carries out said error correction decoding step on the error correction encoded blocks of trick play data by using the first parity words and at least part of the second parity words comprised in the error correction encoded composite blocks of data of the digital video signal.

12. The reproducing arrangement as claimed in claim 11, wherein an error correction encoded blocks of trick play data is formed of N1 rows and N2+N3+N7 columns of data words, and wherein, when the reproducing arrangement is in the trick play reproduction mode, the second error correction decoding means carries out said error correction decoding step on the error correction encoded block of trick play data by using second parity words, in the form of horizontal parity words included in N7 columns of the error correction encoded block of trick play data, and by using first parity words, in the form of horizontal parity words included in N3 columns of the error correction encoded block of trick play data, where N1, N2, N3 and N7 are integer values larger than 1.

13. The reproducing arrangement as claimed in claim 11, wherein an error correction encoded blocks of trick play data is formed of N1+N3 rows and N5+N7 columns of data words, and wherein, when the reproducing arrangement is in the trick play reproduction mode, the second error correction decoding means carries out said error correction decoding step on the error correction encoded block of trick play data by using second parity words, in the form of horizontal parity words included in N7 columns of the error correction encoded block of trick play data, and by using first parity words, in the form of vertical parity words included in N3 rows of the error correction encoded block of trick play data, where N1, N3, N5 and N7 are integer values larger than 1.

14. The reproducing arrangement as claimed in claim 10, wherein an error correction encoded composite block of data is formed of N4+N6 rows and N5+N7 columns of data words, and wherein, when the reproducing arrangement is in a normal play reproduction mode, the first error correction decoding means carries out said error correction decoding step on the error correction encoded composite blocks of data by using second parity words, in the form of horizontal parity words included in said N7 columns of the error correction encoded composite block of data words and vertical parity words included in said N6 rows of the error correction encoded composite block of data words, to form said error corrected blocks of data of the digital video signal, formed of N4 rows and N5 columns of datawords, where N4, N5, N6 and N7 are integer values larger than 1.

* * * * *